US009990176B1

(12) United States Patent
Gray

(10) Patent No.: US 9,990,176 B1
(45) Date of Patent: Jun. 5, 2018

(54) LATENCY REDUCTION FOR CONTENT PLAYBACK

(71) Applicant: Amazon Technologies, Inc., Seattle, WA (US)

(72) Inventor: Timothy Thomas Gray, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/195,464

(22) Filed: Jun. 28, 2016

(51) Int. Cl.
*G06F 3/16* (2006.01)
*G10L 13/04* (2013.01)
*G06F 17/30* (2006.01)

(52) U.S. Cl.
CPC .............. *G06F 3/167* (2013.01); *G06F 3/165* (2013.01); *G06F 17/30755* (2013.01); *G06F 17/30899* (2013.01); *G10L 13/04* (2013.01)

(58) Field of Classification Search
CPC ......... G10L 13/00; G10L 15/26; G10L 15/22; G10L 15/30; G06F 17/3074; G06F 3/165
See application file for complete search history.

(56) References Cited

U.S. PATENT DOCUMENTS

| 6,204,763 | B1 | | 3/2001 | Sone | |
|---|---|---|---|---|---|
| 8,364,694 | B2 | * | 1/2013 | Volkert | G06F 17/30029 707/767 |
| 9,355,110 | B1 | * | 5/2016 | Chi | G02B 27/0172 |
| 9,558,735 | B2 | * | 1/2017 | Roberts | G10L 13/04 |
| 2004/0049389 | A1 | * | 3/2004 | Marko | G10L 13/00 704/260 |
| 2008/0189390 | A1 | * | 8/2008 | Heller | G11B 27/10 709/218 |
| 2009/0030697 | A1 | * | 1/2009 | Cerra | G10L 15/30 704/275 |
| 2009/0030698 | A1 | * | 1/2009 | Cerra | G10L 15/30 704/275 |
| 2010/0088100 | A1 | * | 4/2010 | Lindahl | G10L 15/30 704/270.1 |
| 2010/0169075 | A1 | * | 7/2010 | Raffa | G10L 13/00 704/9 |
| 2011/0038613 | A1 | * | 2/2011 | Buchheit | H04N 5/76 386/297 |

(Continued)

*Primary Examiner* — Matthew Baker
(74) *Attorney, Agent, or Firm* — Pierce Atwood LLP

(57) ABSTRACT

Methods and devices for determining whether a local version of content is stored on an electronic device associated with a user account on a backend system are described herein. In a non-limiting embodiment, the backend system may track and monitor the content stored on the electronic device using the associated user account. If an individual speaks an utterance requesting a particular content item, the backend system may determine, prior to sending the content to the electronic device, whether a local version is stored within the electronic device's memory. If so, the backend system may instruct the electronic device to output the local version, thereby reducing the amount of bandwidth consumed. The backend system may further be capable of predictively generating and then caching certain audio data to the electronic device. For instance, frequent utterances may be tracked, and likely responses to those utterances may be generated prior to the utterance being spoken so that the response is available substantially instantaneously.

17 Claims, 7 Drawing Sheets

(56) References Cited

U.S. PATENT DOCUMENTS

| | | | |
|---|---|---|---|
| 2013/0007208 A1* | 1/2013 | Tsui | G06F 17/30017 709/217 |
| 2013/0085586 A1* | 4/2013 | Parekh | G11B 27/034 700/94 |
| 2013/0173765 A1* | 7/2013 | Korbecki | H04N 21/42209 709/221 |
| 2014/0019573 A1* | 1/2014 | Swift | H04L 67/1095 709/212 |
| 2015/0134334 A1* | 5/2015 | Sachidanandam | G06F 3/167 704/251 |
| 2015/0199967 A1* | 7/2015 | Reddy | G10L 25/30 704/249 |
| 2016/0098998 A1* | 4/2016 | Wang | G06F 17/30424 704/246 |
| 2016/0103652 A1* | 4/2016 | Kuniansky | G06F 3/165 700/94 |
| 2016/0342383 A1* | 11/2016 | Parekh | G11B 27/034 |
| 2016/0378747 A1* | 12/2016 | Orr | G06F 3/167 704/9 |

* cited by examiner

LATENCY REDUCTION FOR CONTENT PLAYBACK

BACKGROUND

Electronic devices may be used to perform a variety of functions, such as, for example, receiving and/or outputting content, as well as communicating with one or more additional devices, servers, and/or networks. Such communications may, for instance, include requests for content, as well as the content itself.

DETAILED DESCRIPTION

Figure 1:
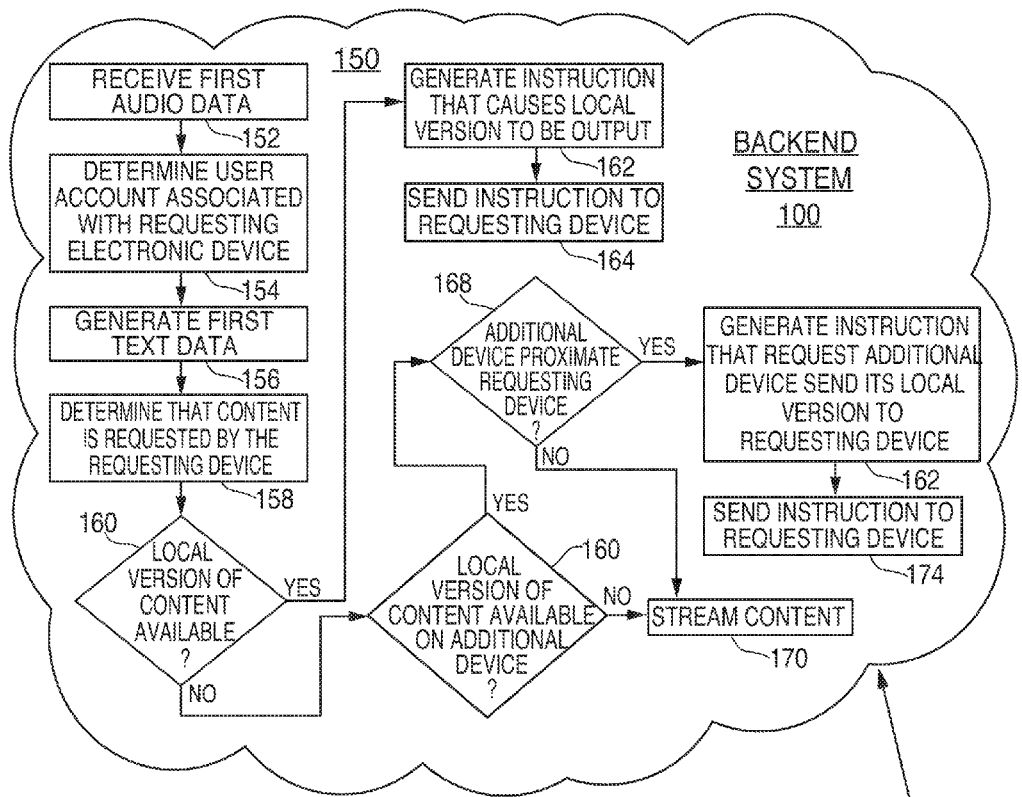
FIG. 1 is an illustrative diagrams of a flowchart and system for determining whether a local version of content is available in response to a request, in accordance with various embodiments.
Figure 1:
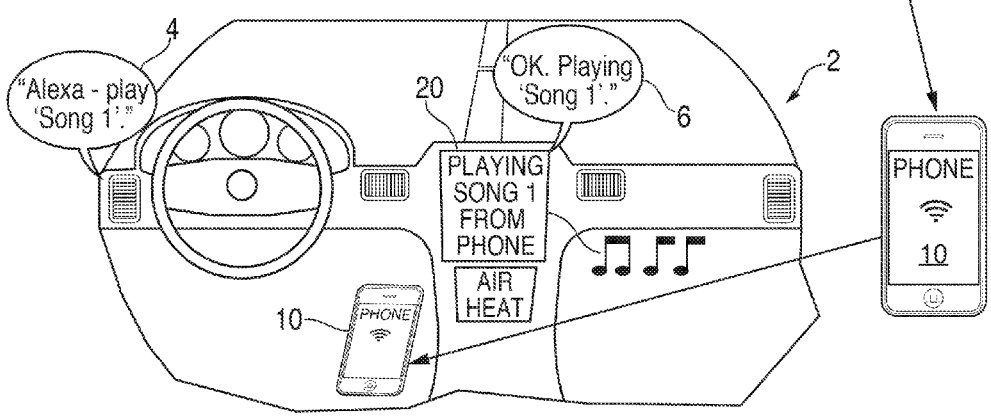

The present disclosure, as set forth below, is generally directed to various embodiments of methods and devices for determining whether a local version of content is available for use by an electronic device, as well as pre-caching local versions of content on an electronic device. An individual, in a non-limiting embodiment, may speak an utterance to their electronic device that requests content, such as an audio file or video file. If the content is not stored locally on the electronic device, then the content may be obtained from a backend system that has the content stored thereon. The content may be sent from the backend system to the electronic device using one or more communications protocols. These communications protocols may, however, cost money to be used, as well as, or alternatively, be limited in bandwidth. Therefore, reducing a file size of the content that is sent from the backend system to the electronic device may save money as well as time. In some embodiments, the individual may have a user account on the backend system, and the backend system may determine whether a local version of the content is available on the electronic device associated with the user account, or any other device capable of communicating with the electronic device. For example, an individual may have a local copy of an MP3 stored on their smartphone. Therefore, if a user speaks an utterance to their smartphone requesting that the MP3 be played, a backend system may determine that the smartphone has the local version of the MP3 stored within its memory, and the backend system may send instructions to the smartphone to play the local version.

In some embodiments, an individual may be located within an automobile or other mode of transportation, which is capable of communicating with the individual's electronic device (e.g., a smartphone, tablet, computer, etc.). The automobile may, for instance, include a communications system, as well as one or more microphones and/or speakers. In response to being activated (e.g., manually activated, voice activated, sound activated, etc.), an individual may speak an utterance, which may be received one the automobile's microphones, and the communications system may send audio data representing the utterance to the electronic device. This may occur, for instance, using a short-range communications protocol, such as a Bluetooth communications protocol (e.g., an 802.11 protocol). In some embodiments, the electronic device may be capable of communicating with a backend system with which a user account is registered that is associated with the electronic device. The electronic device may, in one embodiment, send the audio data to a backend system, which may generate text data representing the audio data, determine an intent of the utterance using the text data, determine a response or action to respond to the intent, and may send audio data representing the response, or instruction to cause the action to be performed, to the electronic device. If appropriate, the electronic device may further communicate the audio data and/or the instruction to the automobile's communications system.

In some embodiments, the backend system may determine, prior to sending content, whether a local version of the content is stored on a local device so as to minimize an amount of data to be sent by the backend system. In one embodiment, the backend system may monitor and track what content is stored on various electronic devices associated with an individual's user account on the backend system. For example, an individual may store a copy of an audio file on their electronic device. Alternatively, the individual may not store a copy of the audio file on their electronic device, and instead may choose to stream the content from the backend system. While this may save storage space on the local electronic device, streaming content to the electronic device may absorb bandwidth. The backend system, with which an individual may have a user account on, may communicate with the electronic device, as well as any other electronic device associated with the user account. Therefore, the content stored locally by the electronic device and/or additional electronic devices, may be monitored for the user account. If specific content is requested by an electronic device, the backend system may determine whether a local version is available, and may provide instructions to play the local version if accessible, or stream the content to the requesting electronic device if no local version is available. Furthermore, the electronic device may be instructed to send of the local version of the content, or the content if streamed from the backend system, to a particular target device to be output.

In some embodiments, the content may be sent to a target electronic device, such as a communications system of an automobile or an additional electronic device (e.g., speakers), from the requesting electronic device. The target electronic device may, for example, be the same as the requesting electronic device (e.g., the device that requested the content is also the device that is to output the content), however persons of ordinary skill in the art will recognize that this is merely exemplary. In an illustrative embodiment, the requesting electronic device, such as an individual's smartphone, may communicate with the target electronic device, such as an automobile's communications system, using a short-range communications protocol (e.g., Bluetooth, Wi-Fi Direct, etc.). The requesting electronic device may send data to a target electronic device using the short-range communications protocol, such that the content (e.g., a local version or a streamed version) may be output by the target electronic device. For example, an individual's smartphone may be instructed by a backend system to send, over a Bluetooth communications channel, a local version of an audio file to an automobile's communication system. In one embodiment, the requesting electronic device and the target electronic device may be "paired" with one another. For example, a device identification number and communication information (e.g., an IP address, MAC address, etc.) of an automobile's communications system may be stored on an individual's smartphone, and vice versa.

As an illustrative embodiment, an individual may speak an utterance, "Alexa—play 'Jingle Bells'," which may be received by one or more microphones of an automobile. The microphones may receive audio signals of the utterance, and a communications system of the automobile may send audio data representing the utterance to an electronic device currently paired with the communications system. The electronic device may then send the audio data to a backend system with which the individual may have a user account on to perform automated speech processing. Upon receipt, the backend system may generate text data representing the audio data, and may determine, using the text data, an intent of the utterance. If the intent was for content, such as audio or video, to be output, then the backend system may determine whether or not any electronic devices associated with the user account include a local version of the content stored within that device's memory. If not, the backend system may for example, send a uniform resource locator ("URL") to the electronic device so that the content may be streamed. However, if the content is stored locally on one of the electronic devices associated with the user account, a determination may be made as to whether or not the electronic device that requested the content is the same device that has the local version stored thereon, or if the electronic device is able to communicate with the device that has the local version stored thereon.

If the electronic device that has the local version stored thereon is the same device that the request for the content originated from, then the backend system may generate an instruction for the electronic device to either output the local version, or to send the local version to a particular target device with which to be output. For example, an MP3 of a particular requested song may be stored within memory of an individual's smartphone. If the individual speaks an utterance to requesting that the song be played using a speaker of an automobile, then the MP3 may be sent to the automobile's communications system to be play the song.

If, however, a different electronic device has a local version of the content stored thereon, then the backend system may first determine a location of the different electronic device and a location of the requesting electronic device. For instance, the backend system may send a location request to both devices to obtain a current GPS location of both devices. The locations of the different electronic device and the requesting electronic device may be compared with one another to determine whether or not the two devices are capable of communicating using a short-range communications protocol. If so, the backend system may generate, and send to the requesting electronic device, a request for the requesting electronic device to send an instruction for the different electronic device to send its local version to the electronic device. The electronic device may then, for example, be further instructed to output, or to send the local version to a target electronic device to be output. If the two devices are not physically proximate such that the local version is not capable of being sent using the short-range communications protocol, then the backend system may cause the content to be streamed to the electronic device. In this instance, the electronic device may also be instructed to then output the content, or to send the streamed content to a particular target device to be output thereby.

In some embodiments, audio data corresponding to various short audio messages may be generated by the backend system, and preemptively sent to the electronic device. For example, audio data of a message, "Good Morning," or "Goodbye" may be generated by the backend system. The backend system may send the audio data to the electronic device such that a local version of the audio data is available if needed. For example, the electronic device may, as a first response to a first utterance each day, may say, "Good Morning." Thus, if an individual speaks a first utterance to their electronic device, "Alexa, Good Morning," the backend system may receive audio data representing the first utterance, generate text data representing the audio data, determine that audio message of the response message is stored on the electronic device, and may send an instruction to the electronic device to play that audio data.

In some embodiments, this message may be employed to delay a response to an utterance. For example, an individual may speak an utterance requesting that a certain action occur. In response to receiving audio data representing the utterance, the backend system may send an instruction to the electronic device that causes the electronic device to play audio data of a pre-stored message. The pre-stored message may have a first temporal duration, such as 0.5 to 2.0 milliseconds. Therefore, the backend system may have additional time with which to determine an appropriate response or action to an intent of the inquiry.

In some embodiments, the backend system may determine, generate, and/or send, to an electronic device, content to be intelligently pre-cached. For instance, the backend system may determine that the electronic device typically requests certain information at a particular time, or based on any additional criteria. As an illustrative example, every morning an individual may say an utterance to their electronic device for that day's weather forecast. The backend system may, in advance of a first day's utterance for the weather forecast, determine the weather forecast for that day, and send audio data, and/or any other suitable data, of a message indicating the day's weather forecast, to the electronic device. This way, when the individual utters their daily request for the weather forecast, the backend system may determine that the requested content is already stored locally on their electronic device, and may send an instruction to the requesting electronic device to output the local version of the content. For example, the backend system may, using a weather application, determine that a current weather forecast is sunny and 75-degrees, may generate and send audio data of an audio message, "It is currently sunny and 75-degrees," to a requesting electronic device to be stored thereon.

In some embodiments, an automobile may, itself, be capable of communicating directly with the backend system, as opposed to communicating, using a short-range communications protocol, with an electronic device that itself communicates with the backend system. For example, the automobile may include LTE or Wi-Fi (e.g., 802.11 protocol) such that the automobile is capable of communicating with one or more additional devices or servers across a network, such as the Internet. This may enable the automobile to send audio data representing an utterance to the backend system, as well as receive audio data representing a response or content, instructions, and/or any other data. Persons of ordinary skill in the art will recognize, however, that a boat, airplane, truck, motorcycle, bicycle, home, office, appliance, and/or device, may be used alternatively instead of an automobile, and the aforementioned is merely exemplary.

In some embodiments, an individual may speak an utterance to their electronic device, such as a sound controlled electronic device, which may be in communication with a backend system. The individual may have an authorized user account on the backend system, such that the individual may receive content or cause certain actions to occur in response to particular spoken commands. For example, an individual may say an utterance, "Alexa—What is the weather?", and may be provided with an audio message of a current weather forecast for their geographical location. However, in some embodiments, the individual, alternatively, ask, while in an automobile paired with their sound controlled device, to have content played. For instance, an individual may say, "Alexa—Play 'Jingle Bells'." In response to receiving audio data representing the utterance, the backend system may determine whether a local version of the song, "Jingle Bells," is stored locally on a device associated with individual's user account. If so, the backend system may instruct that device to output the song, whereas the backend system may alternatively cause the song to be streamed from the backend system to the local device if the no local version is available.

In some embodiments, audio data representing the utterance (e.g., "Alexa—Play 'Jingle Bells'," or "Alexa—What is the weather?") may be sent from the electronic device to the backend system. Upon receipt, the backend system may be configured to generate text data representing the audio data using automatic speech recognition functionality resident on the backend system. The text data may then be provided to natural language understanding functionality to determine an intent of the utterance, as well as one or more likely applications that may be associated with the intent. For example, the natural language understanding functionality may determine that the intent corresponds to a particular application having a particular application name or invocation name (e.g., an application named, "Weather Information Application," or having an invocation name "Weather Information"). As another example, the determined intent may correspond to a particular subject matter or category (e.g., application(s) corresponding to the subject, "weather").

In some embodiments, the requesting electronic device may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system, such as the backend system mentioned previously, in response to detecting a wakeword.

Spoken voice commands, in some embodiments, may be prefaced by a wakeword, which may also be referred to as a trigger expression, wake expression, or activation word. In response to detecting an utterance of the wakeword, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or trigger expression." One exemplary wakeword may be a name, such as the name, "Alexa," however persons of ordinary skill in the art will recognize that any word (e.g., "Amazon"), or series of words (e.g., "Wake Up" or "Hello, Alexa") may alternatively be used. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, an individual may speak an utterance to their electronic device. As an illustrative example, an individual may say an utterance to their voice activated electronic device that is prefaced by a wakeword. In this instance, the utterance may include begin with the wakeword, which may then be subsequently followed by an invocation and an action, command, or question, request. For example, an individual may say "Alexa—Play 'Jingle Bells'," or "Alexa—What is the weather?", or "Alexa—Good Morning." Thus, in response to detecting the utterance of the wakeword, "Alexa," the voice activated electronic device may send audio data representing the utterance (e.g., "Alexa—Play 'Jingle Bells'") to the backend system.

A voice activated electronic device may monitor audio input data detected within its local environment using one or more microphones, transducers, or any other audio input device located on, or in communication with, the voice activated electronic device. The voice activated electronic device may, in some embodiments, then provide the audio data representing the detected audio input data to the backend system for processing or analyzing the audio data, and providing a response to the audio data for the voice activated electronic device, as well as, or alternatively, providing an additional action directed at another device (e.g., a target device). Additionally, the voice activated electronic device may store one or more wakewords within its local memory. If a determination is made that audio data received from the audio input device(s) (e.g., microphone(s)) matches the wakeword, the voice activated electronic device may begin sending all of the audio data to a backend system.

A sound controlled electronic device may also correspond to a sound activated electronic device that may be triggered by a non-verbal sound. For example, the sound of a door opening, an alarm going off, glass breaking, a telephone ringing, or any other sound may alternatively be used to activate a sound activated electronic device. In this particular scenario, detection of a non-verbal sound may occur in a substantially similar manner as that of a verbal wakeword for a voice activated electronic device. For example, the sound of a door opening, when detected, may activate the sound activated electronic device, which may in turn cause the backend system to activate a burglar alarm.

In some embodiments, the requesting electronic device with which the utterance is spoken may, alternatively, correspond to a manually activated electronic device. A manually activated electronic device, as described herein, may correspond to a device to that is capable of being activated in response to a manual input from an individual (e.g., pressing a button, touching a portion of touch screen, performing an action on a device, etc.). For example, a tap-to-talk electronic device is on type of manually activated electronic device. Such tap-to-talk electronic devices, for instance, are capable of obtaining and outputting audio data in response to a button being pressed by an individual.

In some embodiments, an individual may activate their manually activated electronic device (e.g., by pressing a button), and may utter a command for a media item to be played on a particular target electronic device. For example, an individual may press a button on their manually activated electronic device, and may say, "Alexa—Play 'Jingle Bells'." The manually activated electronic device may then send audio data representing the spoken command to a backend system. In some embodiments, an individual may activate their manually activated electronic device using a manual trigger located on an additional electronic device in communication with the manually activated electronic device. For example, an individual may press a button on their automobile that causes an indication to be sent to the manually activated electronic device to activate it. In response, the manually activated electronic device may be configured to receive audio data representing an utterance received by a microphone of additional electronic device, and in turn may send that audio data to the backend system for processing.

FIG. 1 is an illustrative diagrams of a flowchart and system for determining whether a local version of content is available in response to a request, in accordance with various embodiments. In a non-limiting, example embodiment, an electronic device 10 may be used by an individual to communicate with a backend system 100, as well as a communications system of an automobile 2. Electronic device 10 may, for instance, send content, such as audio data representing a song or video data representing a video, to the communications system so that one or more speakers of automobile 2 may output the content. Electronic device 10, in the illustrative embodiment, may be capable of communicating with the communications system of automobile 2 using a short-range communications link, such as Bluetooth or Wi-Fi Direct, or via a hard-wired connection. In response to automobile 2 being turned on, the communications system may determine whether or not electronic device 10 (or any other suitable electronic device) is located within a predefined distance with which the short-range communications link is capable of transmitting data across.

In some embodiments, an individual operating electronic device 10 may speak an utterance 4 requesting that content, such as a song, audiobook, podcast, and/or video, be output. For example, an individual may say, "Alexa—play 'Song 1'." In response to detecting a wakeword (e.g., "Alexa"), electronic device 10 may send audio data representing utterance 4 to backend system 100, which may analyze the audio data, and determine an appropriate action or actions to perform in response. Continuing the previous example, backend system 100 may determine that an intent of utterance 4 was for an audio file corresponding to a song entitled, "Song 1," to be played. In an illustrative embodiment, backend system 100 may determine whether a local version of the content is available on electronic device 10, which provided the request, or whether backend system 100 needs to provide the content to electronic device 10.

Sending data from backend system 100 may, however, be costly in terms of available bandwidth, as well as monetarily. For example, an individual operating electronic device 10 may pay for access to a wireless provider, thereby allowing electronic device 10 to communicating with backend system 100, as well as one or more additional electronic devices, using one or more of the wireless provider's pre-established networks. Typically, an individual subscribes to such access, where the individual pays a certain fee (e.g., daily, weekly, monthly, yearly, etc.) to communicate with one or more additional devices, system, and/or services using the wireless provider's networks. However, restrictions regarding an amount of data that may be sent/received by the individual, and thus any electronic devices that the individual may use for accessing the networks, may also exist. If an individual sends or receives more data than allotted, the individual may be charged additional fees and/or penalties. Minimizing an amount of data that needs to be sent from, and/or received by, electronic device 10 may reduce the likelihood of such overages occurring. Therefore, if a local version of content is capable of being used by electronic device 10, for example, then backend system 100 may not be required to send the content, thereby reducing the amount of data communicated.

However, in order for this to occur, backend system 100 may need to monitor and track the content stored on electronic device 10. In some embodiments, an individual operating electronic device 10 may have a user account on backend system 100. This may allow backend system 100 to monitor a content status of the each device associated with the user account to determine what content is stored locally on electronic device 10, as well as what content is stored locally on any other device also associated with the user account. In response to receiving a request for a particular content item, backend system 100 may determine whether electronic device 10 has a local version of the content stored thereon, and if so, may instruct electronic device 10 to provide the local version instead. In some embodiments, however, an individual may not have a local version of a content item stored on electronic device 10, but may instead have a local version stored on another electronic device. In this particular scenario, backend system 100 may also be configured to monitor locations of each electronic device associated with the user account. Thus, if the local version is not available on electronic device 10, but is available on another electronic device associated with the user account, then backend system 100 may determine whether the two devices are located close enough to one another such that the local version can be sent to electronic device 10. For example, an individual may have an MP3 of a song stored on their tablet, but not on their smartphone. The individual may request that the MP3 be played, and backend system 100 may determine whether the tablet and the smartphone are located proximate to one another such that the tablet may send, using a Bluetooth connection, its local version of the MP3 to the smartphone. If so, the tablet may send the MP3 to the smartphone. However, if not, then backend system 100 may send the content, or a link with which to steam the content, to the smartphone.

In some embodiments, electronic device 10 and automobile 2 may be paired together such that electronic device 10 and automobile 2 are capable of communicating with one another using a pre-existing short-range communications channel. For example, automobile 2 may store device identification information and communications information for electronic device 10 within its local memory. Similarly, electronic device 10 may store device identification information and communications information for the communications system of automobile 2 within its local memory. In this way, when automobile 2 is turned on, the communications system determines whether electronic device 10 is located within communicable range of its local short-range communications network. This may enable an individual to communicate with electronic device 10, and thus backend system 100, using one or more features of automobile 2. For instance, an individual may speak into a microphone of automobile 2, which in turn may send audio data representing an utterance to electronic device 10, and send that audio data to backend system 100. Furthermore, content to be output by electronic device 10 may be output by one or more speakers or display screens of automobile 2. For example, electronic device 10 may send audio data of a song to the communications system of automobile 2 such that the song may be played using a speaker of automobile 2.

In some embodiments, backend system 100 may send audio data representing a message to electronic device 10. For example, electronic device 10 may have a local version of a particular content item stored within its memory. If an individual speaks an utterance requesting that content item to electronic device 10, backend system 100 may determine that a local version is available, and may send an instruction to electronic device 10 to output the content item. Additionally, backend system 100 may also generate audio data of a response message that indicates that the content item is going to be output. For example, backend system 100 may send audio data representing a response message 6, "Ok. Playing 'Song 1'," to electronic device 10. The audio data may then be sent by electronic device 10 to the communications system of automobile 2, such that response message 6 may be output by a speaker of automobile 2. In some embodiments, in addition to the audio data, backend system 100 may send display data representing a user interface to be displayed. For example, backend system 100 may generate and send display data representing a visual message indicating that "Song 1" is playing. The display data may then be sent from backend system 100 to electronic device 10, which in turn may send the display data to the communications system of automobile 2 so that the visual message may be presented using a display screen 20 of automobile 2.

In an illustrative embodiment, individual 2 may speak utterance 4, and one or more microphones of automobile 2 may receive audio signals of utterance 4. The communications system of automobile 2 may send audio data representing utterance 4 to electronic device 10 using a short-range communications protocol, such as Bluetooth or Wi-Fi Direct. Electronic device 10 may send first audio data representing utterance 4 to backend system 100 over a network, such as the Internet, using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments, electronic device 10 and backend system 100 may communicate with one another via a web-browser using HTTP. In some embodiments, however, automobile 2 may, itself, be capable of communicating with backend system 100 using any of the aforementioned communications protocols. For example, automobile 2 may include communications circuitry that allows a communications system of automobile 2 to communicate with backend system 100 over a network, such as the Internet. Various additional communication protocols may be used to facilitate communications between electronic device 10 and backend system 100, and/or automobile 2 and backend system 100, including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more processors, databases, and/or servers, which may be in communication with one another, automobile 2, and/or electronic device 10. Each processor, database, and/or server of backend system 100 may be capable of storing, retrieving, processing, analyzing, and/or generating data to be provided to electronic devices 10, automobile 2, and/or to one or more additional devices. For example, backend system 100 may include one or more game servers for storing and processing information related to one or more different games (e.g., "Simon Says," karaoke, etc.). As another example, backend system 100 may include one or more weather servers for storing weather information and/or providing weather information to electronic device 10. Backend system 100 may, in some embodiments, correspond to a collection of servers located within a remote facility, and individuals may store data on backend system 100 and/or communicate with backend system 100 using one or more of the aforementioned communications protocols.

In some embodiments, backend system 100 may perform an exemplary process 150 in response to electronic device 10 (or automobile 2) being activated. For example, an individual may speak utterance 4, which may include a wakeword for electronic device 10 (e.g., "Alexa"). Upon determining that the wakeword was uttered, electronic device 10 may package and send audio data representing utterance 4 to backend system 100. In one embodiment, electronic device 10 may utilize one or more microphones of automobile 2, such that, when the wakeword is uttered, audio data representing utterance 4 is provided to electronic device 10, which in turn may send the audio data to backend system 100. In yet another embodiment, automobile 2 may, itself, include wakeword detection functionality such that, when an utterance (e.g., utterance 4) is spoke that includes the wakeword, automobile 2 may send audio data representing the utterance to backend system 100.

Process 150 may, in one embodiment, begin at step 152. At step 152, first audio data representing utterance 4 may be received by backend system 100 from a requesting electronic device (e.g., electronic device 10 or automobile 2). Upon receiving the first audio data representing, backend system 100 may generate first text data representing the first text data, and may determine an intent of utterance 4 using the first text data. For example, backend system 100 may determine that the individual wants a particular song, "Song 1," to be played. Backend system 100 may, for instance, determine an invocation of utterance 4 based on one or more invocation terms identified within the first text data. For example, backend system may determine that utterance 4 included the word, "play," as well as an object, "Song 1," and may determine that the intent of utterance 4 is for a song, having the title "Song 1," to be played.

At step 154, a user account associated with the requesting electronic device (e.g., electronic device 10 or automobile 2) that sent the first audio data, may be determined. For example, in addition to, or along with, receiving the first audio data, a customer identification number or a device identification number of electronic device 10 may also be received by backend system 100. Backend system 100 may determine that electronic device 10 is associated with a particular user account for individual 2 based on the received customer or device identification number. As an illustrative example, the first audio data may also include an alphanumeric string (e.g., ABCD1234) that is unique to electronic device 10. Backend system 100 may receive the alphanumeric string and may determine that an authorized user account on backend system 100 may correspond to the alphanumeric string, and therefore may determine that the first audio data was received from electronic device 10 associated with that authorized user account. As described in greater detail below, the user account may include one or more user profiles of the user account, content accessible by the user account, additional devices associated with that user account, and/or applications/functionalities available to be used for the user account.

At step 156, first text data representing the first audio data may be generated. For example, the first audio data may be sent to speech recognition functionality of backend system 100, which may include speech-to-text functionality. In one embodiment, backend system 100 may generate first text data by executing speech-to-text functionality on the first audio data. While techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio data to reduce or minimize extraneous noise, however this is not required.

At step 158, backend system 100 may determine, using natural language understanding functionality, that content is being request by the requesting electronic device. For example, backend system 100 may determine that an intent of utterance 4 is for a song to be played using electronic device 10 or automobile 2, as well as also determining that a title of the song is "Song 1." Backend system 100 may, as described in greater detail below with reference to FIG. 2, determine, using the first text data, that utterance 4 includes a verb, "play," and a noun, "Song 1." Backend system 100 may then determine that the verb, "play," is associated with music functionalities, as well as one or more additional functionalities (e.g., video functionalities, audiobook functionalities, etc.). Furthermore, based on the noun, "Song 1," corresponding to a title of an audio file, backend system 100 may determine that utterance 4 requested that an audio file of the song entitled "Song 1," be played.

At step 160, backend system 100 may determine whether a local version of the requested content is available on the requesting electronic device. In some embodiments, backend system 100 may access the user account associated with the requesting electronic device, and may determine whether the requesting electronic device had previously downloaded a local version of the content. For example, electronic device 10 may have downloaded an MP3 of "Song 1" at an earlier date. Thus, in this scenario, backend system 100 may determine that a local version of the content item may exist on electronic device 10. In some embodiments, however, backend system 100 may further determine what content is currently located on the requesting electronic device. For instance, even if a local version of the content was previously downloaded, that local version may or may not still be stored on electronic device 10. Therefore, backend system 100 may send one or more requests (e.g., a single request, periodic requests, etc.), to electronic device 10 (as well as any other electronic devices associated with the user account) to determine what content are currently being stored on electronic device 10. Backend system 100 may then store an updated inventory of what content available locally on the requesting electronic device (e.g., electronic device 10 or automobile 2) such that, at step 160, a determination is made as to whether or not the requesting electronic device has the local version stored thereon.

If, at step 160, it is determined that the local version is available on the requesting electronic device, then process 150 may proceed to step 162. At step 162, an instruction may be generated by backend system 100 that causes the requesting electronic device to output the local version of the content. For example, backend system 100 may determine that the audio file (e.g., MP3, MP4, .wav, etc.) of the requested song, "Song 1," may be stored locally on electronic device 10. Thus, in one embodiment, backend system 100 may generate an instruction that causes electronic device 10 to play the locally stored audio file of "Song 1." In another embodiment, however, backend system 100 may generate an instruction that causes electronic device 10 to send the local version of the content (e.g., an MP3 of the song, "Song 1") to another electronic device, such as the communications system of automobile 2. In this example, the MP3 of "Song 1" may be played through one or more speakers of automobile 2. Furthermore, at step 164, backend system 100 may send the instruction to the requesting electronic device using any of the previously mentioned communications protocols.

In some embodiments, backend system 100 may further determine a response message to be output by the requesting electronic device. For example, a message may be selected from a listing of responses, where the selected message may indicate to an individual operating the requesting electronic device that the requested content is being provided. In some embodiments, second text data may be received from a prompts module that stores the listing of responses, where the second text data represents the selected message (e.g., "Ok. Playing 'Song 1'."). The second text data may, in one embodiment, be received by a text-to-speech module of backend system 100, which may generate second audio data representing the second text data by executing text-to-speech functionality on the second text data. While techniques for transcribing text into speech are well known in the art and need not be described in further detail herein, any suitable computer implemented text to speech technique may be used to convert the received text into audio signals, such as SOFTSOUND® speech processing technologies available from the Autonomy Corporation, which is headquartered in Cambridge, England, United Kingdom.

If, however, step 160 it is determined that a local version of the content is not available on the requesting electronic device, then process 150 may proceed to step 166. At step 166, a determination may be made as to whether a local version of the content is stored on any additional electronic device that are also associated with the user account. For example, electronic device 10 may not have a local copy of an MP3 of the song, "Song 1," however a tablet, which may also be associated with the same user account on backend system 100 as that of electronic device 10, may have a local copy of the MP3 stored within its memory.

If, at step 166, it is determined that the local version of the content is stored on an additional electronic device associated with the user account on backend system 100, then process 150 may proceed to step 168. At step 168, a determination may be made as to whether the additional electronic device having the local version of the content stored thereon is substantially proximate to the requesting electronic device. In some embodiments, the additional electronic device and the requesting electronic device may be capable of communicating with one another using a short-range communications link, such as Bluetooth or Wi-Fi Direct. However, these short-range communications protocols may require that the devices be substantially proximate to one another (e.g., within a few feet). Thus, at step 168, backend system 100 may receive location information for both the requesting electronic device and the additional electronic device, and may determine whether the physical separation between the devices is less than a threshold separation limit. If not, then process 150 may proceed to step 170, where the content may be streamed from backend system 100 to the requesting electronic device. For example, backend system 100 may send a URL to the requesting electronic device (e.g., electronic device 10), with which the content may be streamed from. This may, however, absorb bandwidth with the network provider of electronic device 10 and therefore is resorted to in the situation that no local versions are available. Similarly, if at step 166 it is determined that no additional electronic devices exist, or that no additional electronic devices include a local version of the content, the process 150 may also proceed to step 170.

If, however, at step 168, it is determined that the additional electronic device is located proximate to the requesting electronic device, then process 150 may proceed to step 172. At step 172, an instruction may be generated that requests that the additional electronic device send its local version of the content to the requesting electronic device. For example, an individual's tablet may be located within automobile 2, along with electronic device 10. Backend system 100 may generate an instruction that causes electronic device 10 to request that the tablet send its local version of the content to electronic device 10 using a short-range communications link existing there between. At step 174, backend system 100 may send the instruction to the requesting electronic device. For example, backend system 100 may send the instruction to electronic device 10, which in turn may send a request to the tablet for the local version. The tablet may, in response to the request, send the local version to electronic device 10 using the short-range communications link (e.g., Bluetooth or Wi-Fi Direct), and electronic device 10 may output the local version itself, or send the local version to the communications system of automobile 2 to be output thereby. In some embodiments, backend system 100 may, alternatively, generate an instruction that causes the additional electronic device to send the local version to a particular target device. For example, instead of requesting that the tablet send the local version to electronic device 10, the instruction may cause the tablet to send the local version to the communications system of automobile 2.

Figure 2:
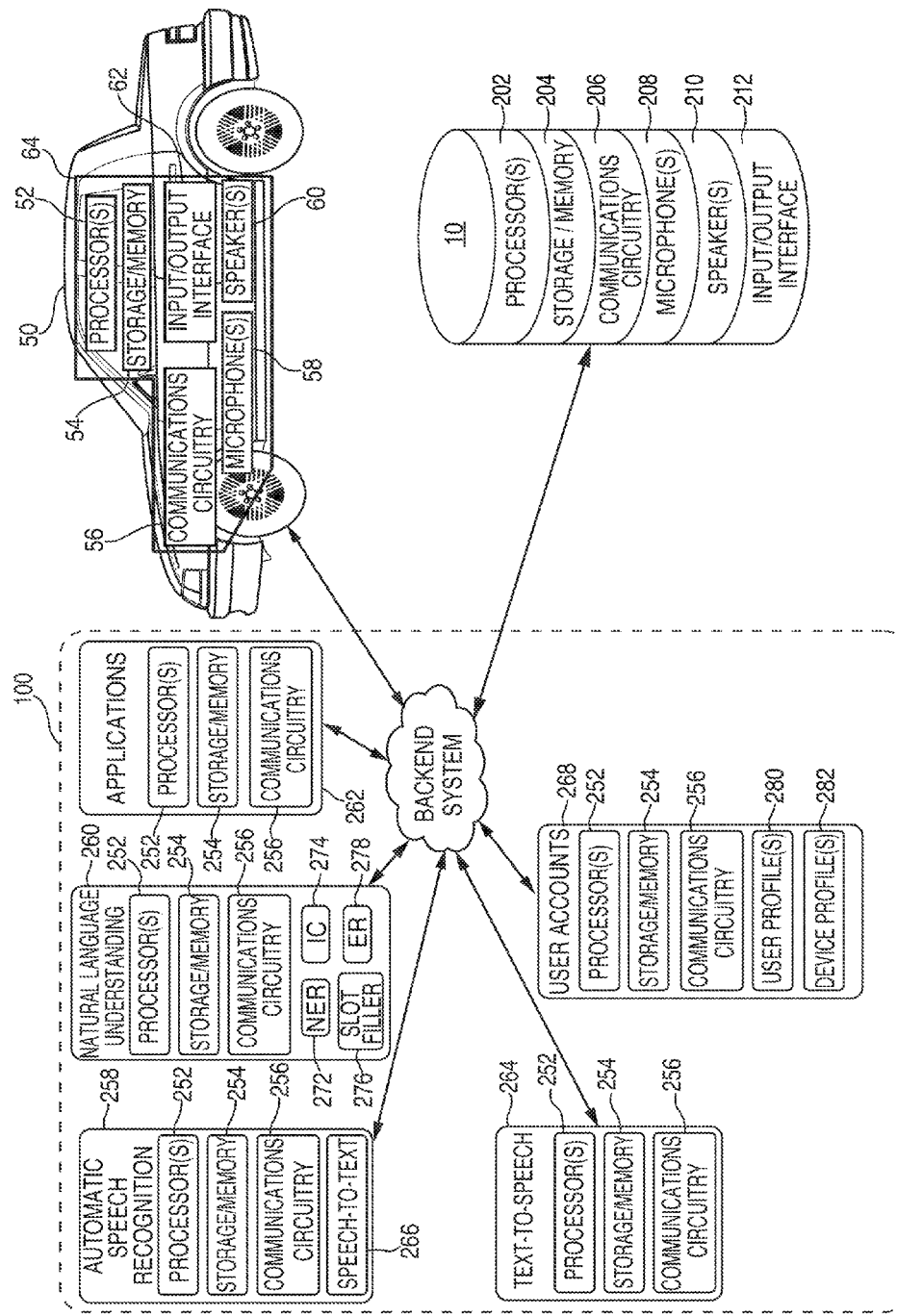
FIG. 2 is an illustrative diagram of a portion of the system architecture of FIG. 1, in accordance with various embodiments.

FIG. 2 is an illustrative diagram of a portion of the system architecture of FIG. 1, in accordance with various embodiments. Electronic device 10, in some embodiments, may correspond to any type of electronic device capable of being activated in response to detecting a specific sound, such as a voice activated electronic device. After detecting a specific sound (e.g., a wakeword or trigger), electronic device 10 may, in some embodiments, recognize commands (e.g., audible commands, inputs) within captured audio, and may perform one or more actions in response to the received commands. Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 10 may be relatively simple or basic in structure such that no mechanical input option(s) (e.g., keyboard, mouse, track pad) or touch input(s) (e.g., touchscreen, buttons) may be provided. For example, electronic device 10 may be a voice activated electronic device, and may be able to receive and output audio, and may include power, processing capabilities, storage/memory capabilities, and communication capabilities. However, in some embodiments, electronic device 10 may include one or more mechanical input options and or touch input components.

Electronic device 10 may, in an illustrative non-limiting embodiment, include a minimal number of input mechanisms, such as a power on/off switch. However primary functionality, in one embodiment, of electronic device 10 may solely be through audio input and audio output. For example, electronic device 10 may listen for a wakeword by continually monitoring local audio. In response to the wakeword being detected, electronic device 10 may establish a connection with backend system 100, send audio data to backend system 100, and await/receive a response from backend system 100.

In some embodiments, however, electronic device 10 may correspond to a manually activated electronic device. In response to detecting a manual input, electronic device 10 may also communicate with backend system 100 (e.g., push-to-talk devices). For example, in response to pressing and holding a button, tapping a button or touch screen, or providing any other suitable manual input, electronic device 10 may be configured to record audio. Furthermore, electronic device 10 may also be configured to establish a connection with backend system 100, send audio data representing the recorded audio to backend system 100, and await/receive a response from backend system 100, in response to the manual input and the audio being recorded.

Electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within electronic device 10, and/or one or more components may be omitted. For example, electronic device 10 may include a power supply or a bus connector. As another example, electronic device 10 may not include an I/O interface (e.g., I/O interface 212). Furthermore, while multiple instances of one or more components may be included within electronic device 10, for simplicity only one of each component has been shown.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing, or to be processed locally using electronic device 10.

The wakeword database may be a database stored locally on electronic device 10 that includes a list of a current wakeword for electronic device 10, as well as one or more previously used, or alternative, wakewords for electronic device 10. In some embodiments, an individual may set or program a wakeword for electronic device 10. The wakeword may be programmed directly on electronic device 10, or a wakeword or words may be set by an individual via a backend system application that is in communication with backend system 100. For example, an individual may use their mobile device having the backend system application running thereon to set the wakeword. The specific wakeword may then be communicated from the mobile device to backend system 100, which in turn may send/notify their voice activated electronic device (e.g., electronic device 10) of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of a video or of audio may be stored within the sound profile database of storage/memory 204 on electronic device 10. In this way, if a particular sound (e.g., a wakeword or phrase) is detected by electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold value to determine whether the wakeword may be declared as having been spoken.

The wakeword detection module may compare audio data to stored models or data to detect the presence of a wakeword within an utterance. For instance, the wakeword detection module may apply general large vocabulary continuous speech recognition ("LVCSR") systems to decode audio signals, with wakeword searching conducted in resulting lattices or confusion networks. LVCSR decoding may require relatively large computational resources, however.

In some embodiments, the wakeword detection module may employ a keyword spotter, which may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its MINI model to an MINI model of the trigger expression, yielding a feature score that represents the similarity of the audio signal model to the trigger expression model.

In practice, an HMM recognizer may produce multiple feature scores, corresponding to different features of the MINI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to backend system 100 for detecting and responds to subsequent utterances made by an individual.

There may be one or more HMMs built to model the non-wakeword speech characteristics, which are named filler models. Viterbi decoding may be used to search for the best path in the decoding graph, and the decoding output may be further processed to make the decision on keyword presence. This approach can be extended to include discriminative information by incorporating hybrid deep neural network ("DNN")-HMM decoding framework. In another embodiment the wakeword spotting system may be built on DNN/recursive neural network ("RNN") structures directly, without HMM involved. Such a system may estimate the posteriors of wakewords with context information, either by stacking frames within a context window for DNN, or using RNN. Following-on posterior threshold tuning or smoothing may be applied for making decisions. Persons of ordinary skill in the art will recognize that other wakeword detection techniques may also be employed, and the aforementioned are merely exemplary.

Communications circuitry 206 may include any circuitry allowing or enabling electronic device 10 to communicate with one or more devices, servers, and/or systems. For example, communications circuitry 206 may facilitate communications between electronic device 10 and backend system 100, between electronic device 10 and one or more additional electronic devices, and/or between electronic device 10 and automobile 2. Communications circuitry 206 may use any communications protocol, such as any of the previously mentioned exemplary communications protocols. In some embodiments, electronic device 10 may include an antenna to facilitate wireless communications with a network using various wireless technologies (e.g., Wi-Fi, Bluetooth®, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds (e.g., far-field microphones), while some microphones may be optimized for sounds occurring within a close range of electronic device 10.

Electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly wired, or hard-wired, to electronic device 10, that may be capable of broadcasting audio directly to an individual.

In some embodiments, one or more microphones 208 may serve as input devices to receive audio inputs. Electronic device 10, in the previously mentioned embodiment, may then also include one or more speakers 210 to output audible responses or follow-up statements. In this manner, electronic device 10 may function solely through speech or audio, without the use or need for any input mechanisms or displays.

In one exemplary embodiment, electronic device 10 includes I/O interface 212. The input portion of I/O interface 212 may correspond to any suitable mechanism for receiving inputs from an individual operating electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of electronic device 10. In some embodiments, one or more vibrating mechanisms or other haptic features may be included with I/O interface 212 to provide a haptic response to an individual from electronic device 10. Persons of ordinary skill in the art will recognize that, in some embodiments, one or more features of I/O interface 212 may be included in a purely voice activated version of electronic device 10. For example, one or more LED lights may be included on a voice activated electronic device such that, when microphone(s) 208 receive audio, the one or more LED lights become illuminated signifying that audio has been received by the voice activated electronic device. In some embodiments, I/O interface 212 may include a display screen and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, subject matter servers/skills module 262, text-to-speech ("TTS") module 264, and user accounts module 268. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

For instance, ASR module 258 may transcribe received audio data into text data representing the words of the speech contained in the audio data using STT module 266. The text data may then be used by other components for various purposes, such as executing system commands, inputting data, etc. ASR module 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR module 258 may output the most likely text recognized in the audio data. ASR module 258 may also output multiple hypotheses in the form of a lattice or an N-best list with each hypothesis corresponding to a confidence score or other score (such as probability scores, etc.).

ASR module 258 may further attempts to match received feature vectors to language phonemes and words as known in acoustic models and language models stored within storage/memory 254 of ASR module 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, video, books, shopping, etc.

ASR module 258 may generate results in the form of a single textual representation of the speech, an N-best list including multiple hypotheses and respective scores, and/or lattice, for example, which may be sent to NLU module 260 for processing, such as conversion of the text into commands for execution, either by electronic device 10, backend system 100, automobile 2, or by another device, such as a separate device or server capable of performing one or more additional functionalities thereon (e.g., a television capable of outputting video content).

NLU module 260 may be configured such that it determines an intent of an utterance based on the received audio data. For example, NLU module 260 may determine that the intent of utterance 4 is for content (e.g., a song or video to be played on a local device). In response to determining the intent of utterance 4, NLU module 260 may communicate the received command to an appropriate subject matter server, application, or skill on applications module 262 to cause one or more specific functionalities to be accessed, perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU module 260 may include a named entity recognition ("NER") module 272, which may be used to identify portions of text that correspond to a named entity recognizable by NLU module 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU module 260 takes textual input and attempts to make a semantic interpretation of the text. That is, NLU module 260 may be configured to determine a meaning of text based on the individual words and then implements that meaning. In some embodiments, NLU module 260 may interpret a text string to derive an intent or a desired action of the utterance (e.g., utterance 4) as well as the pertinent pieces of information in the text that allow an action to be completed. For example, if a spoken utterance is processed by ASR module 258 and outputs the text, "call mom," NLU module 260 may determine that an intent of the utterance is to activate a telephone, or telephone functionality, and to initiate a call with a contact matching the entity "mom". In some embodiments, NLU module 260 may process several textual inputs related to the same utterance. For example, if ASR module 258 outputs N-text segments (as part of an N-best list), then NLU module 260 may process all N outputs.

As will be discussed further below, NLU module 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU module 260 may be used to provide answer data in response to queries, for example using a knowledge base stored within storage/memory 254 of NLU module 260 and/or storage/memory of backend system 100.

To correctly perform natural language understanding processing of input speech, NLU module 260 may be configured to determine a "domain" of an utterance. By determining the domain, NLU module 260 may narrow down which services and functionalities offered by an endpoint device (e.g., electronic device 10, automobile 2, backend system 100, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account on backend system 100. Words in a single text query may implicate more than one service, and some services may be functionally linked (e.g., both a telephone service and a calendar service may utilize data from the contact list).

NER module 272 may be configured to receive a query in the form of one or more results from ASR module 258. NER module 272 may then attempt to identify relevant grammars and lexical information that may be used to construe meaning of the one or more results. To do so, NER module 272 may begin by identifying potential domains that may relate to the received query. NLU module 260 may include a database of devices within storage/memory 254 of NLU module 260 that may be used to identify domains associated with specific devices. For example, electronic device 10 may be associated with domains for music, telephone functionality, calendar information, contact lists, and/or device-specific communications. In addition, NLU module 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping", "music", or "applications". As such, each domain may be associated with a particular language model and/or grammar database, a particular set of intents/actions, and a particular personalized lexicon. Each gazetteer may include domain-indexed lexical information associated with a particular user account of user accounts module 268 and/or electronic device 10. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU module 260 may be configured to apply the rules, models, and information applicable to each identified domain. For example, if a query potentially implicates both communications and music, the query may, substantially in parallel, use the grammar models and lexical information for communications, and may also use the grammar models and lexical information for music. The responses based on the query produced by each set of models is scored, with the overall highest ranked result from all applied domains is ordinarily selected to be the correct result.

An intent classification ("IC") module 274 may parse the query to determine an intent or intents for each identified domain, where the intent corresponds to the action to be performed that is responsive to the query. Each domain is associated with a database of words linked to intents. For example, a music intent database may link words and phrases such as "quiet," "volume off," and "mute" to a "mute" intent. IC module 274 may be configured to identify potential intents for each domain by comparing words in the query to the words and phrases in that domain's intents database. Traditionally, the determination of an intent by IC module 274 is performed using a set of rules or templates that are processed against the incoming text to identify a matching intent.

In order to generate a particular interpreted response, the NER 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC module 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, NER module 272 may parse the query to identify words as subject, object, verb, preposition, etc., based on grammar rules and/or models, prior to recognizing named entities. The identified verb may be used by IC module 274 to identify intent, which is then used by NER module 272 to identify frameworks. A framework for an intent of "play" may specify a list of slots/fields applicable to play the identified "object" and any object modifier (e.g., a prepositional phrase), such as, for example, {Artist Name}, {Album Name}, {Song name}, etc. NER module 272 may then search the corresponding fields in the domain-specific and personalized lexicon(s), attempting to match words and phrases in the query tagged as a grammatical object or object modifier with those identified in the database(s).

This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "play Song 1 by Artist 1" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 274 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, NER module 272 may search the database of generic words associated with the particular domain. So for instance, if the query was "play songs by Artist 1," after failing to determine an album name or song name called "songs" by "Artist 1," NER module 272 may search the domain vocabulary for the word "songs." In the alternative, generic words may be checked before the gazetteer information, or both may be tried, potentially producing two different results.

The results of the natural language understanding processing may be tagged to attribute meaning to the query. So, for instance, "play Song 1 by Artist 1" might produce a result of: {domain} Music, {intent} Play Music, {artist name} "Artist 1," {media type} SONG, and {song title} "Song 1." As another example, "play songs by Artist 1" might produce: {domain} Music, {intent} Play Music, {artist name} "Artist 1," and {media type} SONG.

The output from NLU module 260 (which may include tagged text, commands, etc.) may then be sent to a command processor, which may be located on, or in communication with, backend system 100. The destination command processor may be determined based on the output of NLU module 260. For example, if NLU module 260 outputs include a command to play music, the destination command processor may be a music playing application, such as one located on electronic device 10 or in a music playing application, configured to execute a music playing command. If the output of NLU module 260, however, includes a search request, the destination command processor may include a search engine processor, such as one located on a search server, configured to execute a search command.

In some embodiments, NLU module 260 may also include an entity resolution ("ER") module 278, which allows NLU module 260 to query each domain of NLU module 260 to determine which domain or domains believe that they can handle a given request. Upon performing the query, each domain of domain module 272 may return a "score" indicating a likelihood that they can handle the skill in question. For instance, various domains may return scores of LOW, MEDIUM, or HIGH, indicating the likelihood that they can handle the particular skill. Entity resolution module 278 may return application names or titles for the request, which may be based on relevance scores that estimate a confidence that a particular application may be best used for the request. As an illustrative example, if the utterance is, "Play My Music," NLU module 260 may determine, using entity resolution module 278, which domains, and thus applications, can likely handle this request, and may select the domain and/or application having the highest confidence score as the domain and/or application to handle the request. Furthermore, as described in greater detail below, NLU module 260 may further include a slot filler module 276.

In a non-limiting embodiment, NLU module 260 may be a multi-domain architecture where each domain (which may include a set of intents and entity slots that define a larger concept such as music, books etc.) is constructed separately and made available to NLU module 260 during runtime operations where natural language understanding functionality operations are performed on text (such as text output from ASR module 258). Each domain may have specially configured components to perform various steps of the NLU operations. For instance, each domain may include a component of NER module 272, IC module 274, Slot Filler module 276, and entity resolution module 278, which may be specific to that particular domain.

For example, a music domain may have an NER component that identifies what slots (i.e., portions of input text) may correspond to particular entities relevant to that domain. For example, for the text "play songs by Artist 1," an NER component trained for a music domain may recognize the portion of text (e.g., "Artist 1") corresponds to an entity and an artist name. The NER component may use a machine learning model, such as a domain specific conditional random field ("CRF") to both identify the portions corresponding to an entity as well as identify what type of entity corresponds to the text portion. For example, for the text "Play 'Song 1'," an NER component trained for an application music playing application domain may recognize the portion of text (e.g., "Song 1") corresponds to a title of a song. The music domain may also have its own intent classification ("IC") component may determine that the intent of the text, assuming that the text is within the proscribed domain. IC components may use a model, such as a domain specific maximum entropy classifier to identify the intent of the text. The music domain may also have its own slot filler component that can apply rules or other instructions to standardize labels or tokens from previous stages into an intent/slot representation. The precise transformation may depend on the domain. For example, a travel domain may include a text mention of "Seattle airport," and may be transform the text mention to the standard three-letter code referring to that airport (e.g., SEA). Specific intent/slot combinations may also be tied to a particular source, which may then be used to resolve the text (such as by providing information or a command to be executed in response to a user query). The music domain may also have its own entity resolution component that can refer to an authority source (such as a domain specific knowledge base)

used to specifically identify the precise entity referred to in the entity mention identified in the incoming text. Using the example, "play songs by Artist 1," the source may be tied to a personal music catalog or the like. The output from the entity resolution component may include a command, information, or other NLU result data indicating how the domain specific NLU processing handled the text and how the system should respond to the text, according to that specific domain.

In some embodiments, the multiple domains of NLU module 260 may operate substantially in parallel, with different domain specific components. Each domain may have its own NER component, IC module, slot filler component, and entity resolution component. The same text that is input into the NLU pipeline for a first domain (e.g., Domain A) may also be input into the NLU pipeline for a second domain (e.g., Domain B), where the components for Domain B may operate on the text as if the text related to Domain B, and so on for the different NLU pipelines for the different domains. Each domain specific NLU pipeline will create its own domain specific NLU results, for example Results A for Domain A, Results B for Domain B, Results C for Domain C, and so on. The different results may then be input into a domain ranking component, which may ranks the different results for the different domains, and selects what the system believes to be the most applicable results given the input text and other factors. Those highest ranking results may then be used to execute a command, perform one or more actions, or obtain information responsive to a user query, or otherwise respond to the input text.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU module 260 may result in only one such action being performed with any acknowledgement of ambiguity as the "Title" can refer to a book, movie, or soundtrack (or possibly all three).

Applications module 262 may, for example, correspond to various action specific applications, skills, or servers, which are capable of processing various task specific actions and/or performing various functionalities. Applications module 262 may further correspond to first party applications and/or third party applications capable of performing various tasks or actions, or performing various functionalities. For example, based on the context of the audio received from electronic device 10, backend system 100 may use a certain application to generate a response, or to obtain response information, which in turn may be communicated back to electronic device 10 and/or to another electronic device (e.g., a television). For instance, utterance 4 may ask a particular song to be played, and therefore applications module 262 may access a music streaming application capable of providing an audio file, or a URL to a website, for the song such that the other electronic device may play the song thereon. Applications module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user accounts or user profiles within user profiles module 282, corresponding to users having a registered account on backend system 100. For example, a parent may have a registered account on backend system 100, and each of the parent's children may have their own user profile registered under the parent's registered account. Information, settings, and/or preferences, for example, for each user profile may be stored within user profile module 282. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, user accounts module 268 may include a list of media items currently stored within an individual's registered account or user profile. For example, a list of music or videos purchased or obtained by an individual may be stored within the individual's user profile on user accounts module 268, which may be accessed by the individual when the individual seeks to hear a particular song or songs, or view a particular video or videos. Furthermore, user accounts module 268 may store a listing of what content is currently stored locally on one or more devices associated with an individual's user account or profile on user accounts module 268. For example, a listing of what songs or videos are currently stored on electronic device 10 may be stored within a user account of an individual who is a registered user of electronic device 10. Still further, user accounts module 268 may store and monitor a download or upload history for an individual's user account, such that backend system 100 is aware of what content has been downloaded from backend system 100 to electronic device 10 (or any other electronic device associated with the user account) and/or any content that has been uploaded from electronic device 10 to backend system 100.

User accounts module 268 may also include applications module 280, which stores a listing of all applications currently enabled for each user profile stored within user profiles module 282. In some embodiments, NLU module 260 may receive indications of which applications are currently enabled for a particular user profile or account, such that NLU module 260 is aware of which rules and capabilities that backend system 100 is able to perform for the particular user profile or account.

Backend system 100 may, in one embodiment, also include a prompts module including a listing of responses. The listing of responses may include text data of these responses, as well as a prompt identifier for each response's corresponding text. When backend system 100 attempts to determine what response to provide to electronic device 10, whether it is in response to an utterance or an answer to a question, NLU module 260 may receive one or more prompts that most likely may be used for responding to different utterances based on the format of an invocation. For instance, after an application being enabled, NLU module 260 may receive an indication that a particular prompt is best suited for a response to be sent to electronic device 10 to indicate that the application has been enabled.

In one non-limiting, illustrative embodiment, the listing of responses may be arranged by prompt identifier and corresponding text data representation of a response. When a response is needed to be provided to a requesting device, such as electronic device 10, NLU module 260 polls each domain to determine which domain should likely handle providing the response. Each domain may provide one or more prompt identifiers that correspond to a best response, and NLU module selects the prompt identifier having the highest ranking. For example, similarly to how NLU module 260 determined which domain could handle a particular application, NLU module 260 may also determine scores of LOW, MEDIUM, or HIGH, indicating the likelihood that a particular domain can handle the particular response. However, a particular prompt may be selected using any other suitable technique, and the aforementioned is merely exemplary.

Each prompt identifier may be associated with a particular response, and therefore text data representing that particular response, such that when a prompt is selected to be used, the prompt module is capable of determining that the selected prompt corresponds to a particular response. The text data representing that response may be provided to TTS module 264, which in turn may generate audio data representing that text data. That audio data may be sent to the requesting device (e.g., electronic device 10), such that an audio message of that response may be output by the requesting device. As an illustrative example, the music domain may select a response corresponding to response message 6. Thus, NLU module 260 may send a request to the prompts module to send the text data corresponding to the prompt that is associated with that prompt identifier to TTS module 264. The prompts module may send text data representing the response, "Ok. {Action} {Object}," to TTS module 264. NLU module 260 may further send the slot results for slot {Action} and slot {Object} to TTS module 264, such that the framework of the selected response is formulated, and the text data representing the response may be used to generate audio data. For example, if {Action}: Playing, and {Object}: Song 1, then the response would be, "Ok. Playing ' Song 1'."

Persons of ordinary skill in the art will further recognize that various other prompts may be included within the prompts module. For example, there may be L prompts (e.g., prompts 1, 2, 3, 4, 5, 6 . . . L, where L is any number greater than zero (e.g., L>0)). Similarly, for however many prompts are included, there may be an associated response. For example, the responses with slots may respectively include, but are not limited to, "{Confirmation Status}. {Song Title} is now {Action}."; "Ok. {Artist Name} is {Action}."; and the like.

Persons of ordinary skill in the art will recognize that although each of ASR module 258, NLU module 260, applications module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, applications module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

In an illustrative, non-limiting embodiment, an automobile 50 may also be capable of communicating with backend system 100 using any of the previously mentioned communications protocols. Automobile 50 may also, in the illustrative embodiment, be capable of communicating with electronic device 10 through backend system 100. Still further, automobile 50 may, in one embodiment, be capable of communicating with electronic device 10, and/or one or more additional electronic devices, using one or more short-range communications protocols.

Automobile 50, in the illustrative embodiment, may correspond to any suitable device including an engine or other means with which to transport one or more persons or items. Persons of ordinary skill in the art will recognize that, although automobile 50 is included within FIG. 2, any other suitable transportation means may alternatively be used including, but not limited to, cars, trucks, motorcycles, boats, planes, bicycles, or any other transportation means, or any combination thereof. In some embodiments, a person household computer system may also be capable of communicating with backend system 100 and/or electronic device 10.

Automobile 50 may include a support frame, wheels (e.g., three wheels, four wheels, or more), an engine capable of propelling automobile 50, one or more batteries, a body, as well as a communications system 64. Persons of ordinary skill in the art will recognize, however, that various additional components of automobile 50 may also be included, such as one or more lights, windows, heating/cooling systems, braking systems, and the like. Communications systems 64 may correspond to any suitable component or components that allows for content, data, and/or information to be provided to an individual operating, or otherwise occupying, automobile 50. For example, communications system 64 may be capable of displaying temporal information, automobile performance information (e.g., fuel level, speed, etc.), and audio/video data. In some embodiments, automobile 50 may include a built-in network, or networking capabilities, such that automobile 50 is capable of communicating with one or more networks, such as the Internet, as well as one or more additional devices (e.g., electronic device 10), servers, databases, and/or systems (e.g., backend system 100). For example, an individual may subscribe to such wireless provider's network, where the individual pays a certain fee (e.g., daily, weekly, monthly, yearly, etc.) so that automobile 50 may be able to communicate across the wireless provider's networks.

In one example embodiment, communications system 64 may include one or more processors 52, storage/memory 54, communications circuitry 56, one or more microphone(s) 58, one or more speaker(s) 60, as well as an optional I/O interface 62. Processors 52, storage/memory 54, communications circuitry 56, microphone(s) 58, speaker(s) 60, and I/O interface 62 may, for example, be substantially similar to processors 202, storage/memory 204, communications circuitry 206, microphone(s) 208, speaker(s) 210, and I/O interface 212 of electronic device 10, and the previous description may apply. In an embodiment, an individual may communicate with electronic device 10 by first communicating with communications system 64, which in turn may communicate with electronic device 10. In some embodiments, automobile 50, and in particular communications circuitry 56 of communications system 64, may communicate with electronic device 10 using one or more short-range communications protocols, such as Bluetooth or Wi-Fi Direct, however persons of ordinary skill in the art will recognize that this is merely exemplary.

Figure 3A:
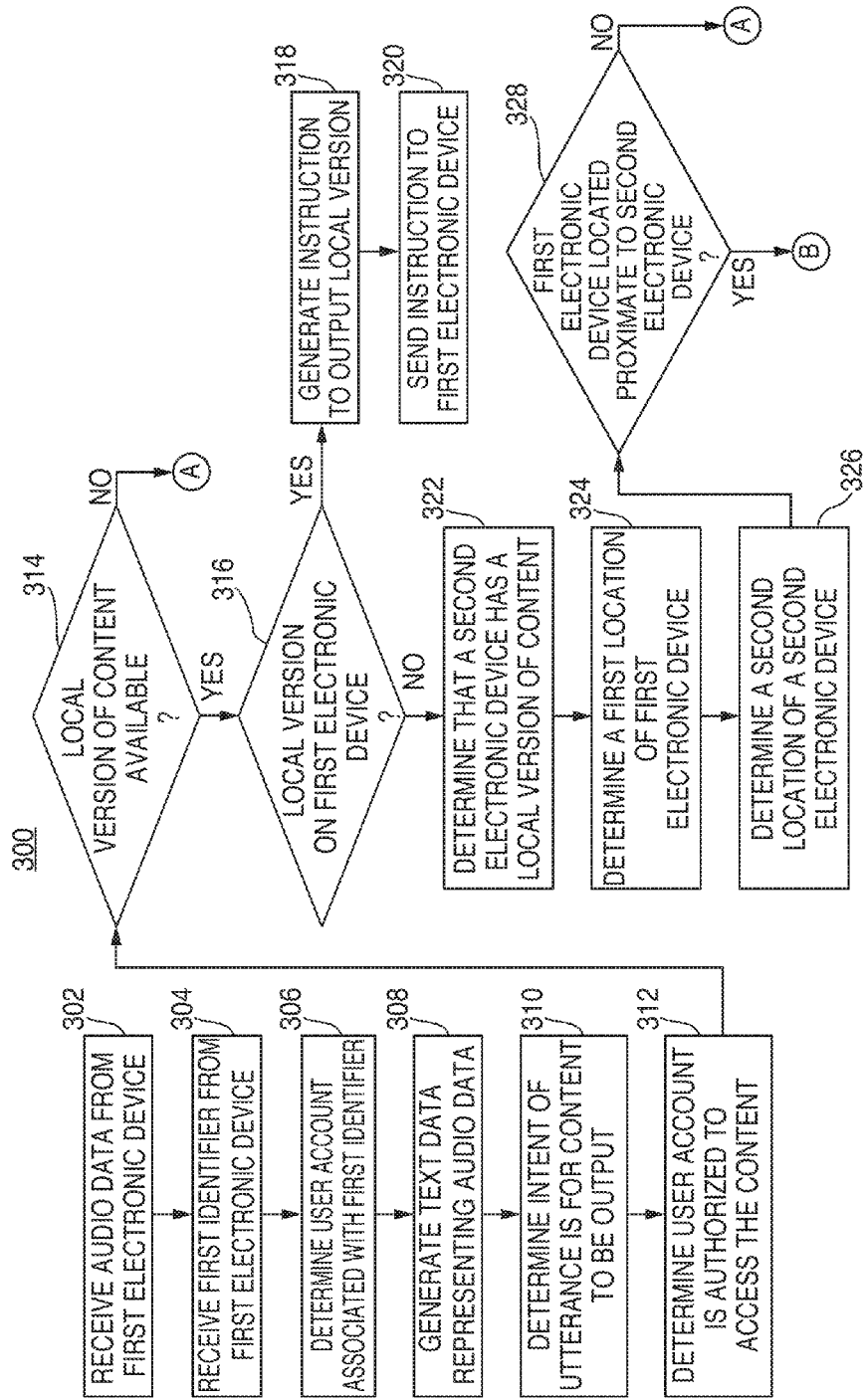
FIGS. 3A and 3B are illustrative flowcharts of a process for determining whether a local version of content is available to be output by a target device, in accordance with various embodiments.
Figure 3B:
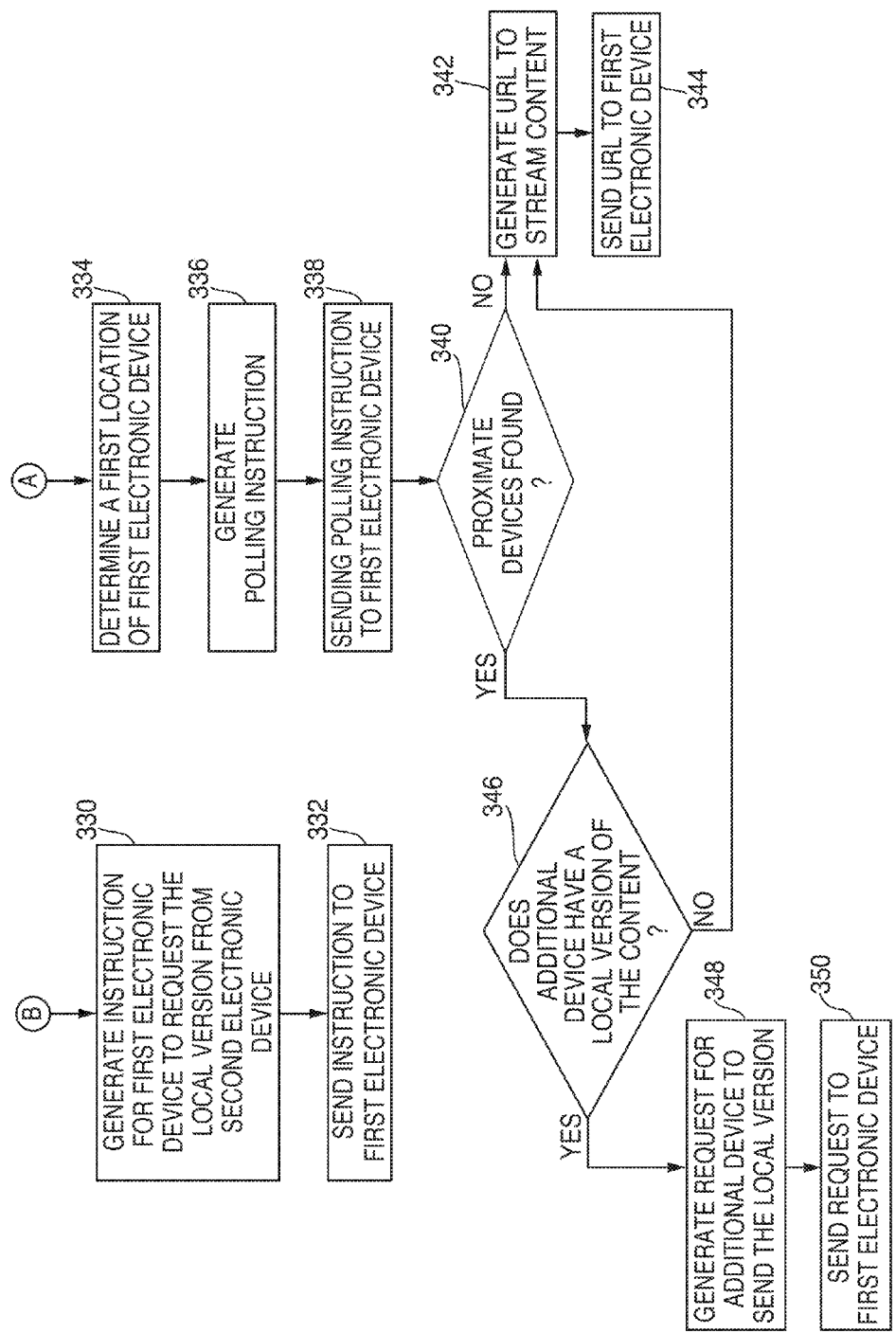

FIGS. 3A and 3B are illustrative flowcharts of a process for determining whether a local version of content is available to be output by a target device, in accordance with various embodiment. Process 300, in one embodiment, may begin at step 302. At step 302, audio data may be received from a first electronic device. For example, backend system 100 may receive audio data representing an utterance from electronic device 10. As another example, backend system 100 may receive audio data representing an utterance from automobile 50. The utterance may correspond to a request for content to be provided to a particular requesting device that sent the audio data, however the request may alternatively indicate that content is to be sent by backend system 100 to a different electronic device (e.g., a target device). As an illustrative example, an individual may speak an utterance, such as utterance 4, "Alexa—play 'Song 1'." In response to detecting a wakeword (e.g., "Alexa"), the requesting device may send audio data representing the utterance to backend system 100.

In some embodiments, one or more microphones of another device may receive the audio. For example, an individual may speak utterance 4 to microphone(s) 58. Upon receiving audio signals of utterance 4, communications system 64 may generate audio data representing utterance 4, and may send the audio data to electronic device 10. The audio data may be sent to electronic device 10 using a short-range communications protocol, such as Bluetooth, Wi-Fi Direct, or a wireless person network. Electronic device 10, in the illustrative embodiment, may be capable of communicating with backend system 100 using one or more networks, such as the Internet. Therefore, the audio data, after being received by electronic device 10, may then be sent by electronic device 10 to backend system 100.

At step 304, a first identifier may be received by backend system 100 from the first electronic device. The first identifier may, in some embodiments, be one or more numbers, letters, and/or characters with which may be used to identify electronic device 10. As an illustrative example, electronic device 10 may have an eight-character identification number, "ABCD1234," which may be sent to backend system 100 at a substantially same time as any audio data (e.g., audio data representing utterance 4). Various types of identifiers may be used including, but are not limited to device identifiers, customer identifiers, serial numbers, IP addresses, media access control ("MAC") addresses, or any other identification representations, or any combination thereof.

At step 306, a user account that is associated with the first identifier of the first electronic device may be determined. In some embodiments, an individual may have a registered user account on backend system 100. The user account, for instance, may be stored within user accounts module 268. Devices that are authorized to communicate with backend system 100 may have their identifiers stored within an individual's device profile(s) component 282 for that individual's user account. For example, an individual may register a user profile on backend system 100, and backend system 100 may store device credentials for each device that is used by the individual to interact with the various functionalities of backend system 100. In some embodiments, an individual may also store various content, such as music, videos, books, lists, shopping histories, and the like, within their user account. Furthermore, backend system 100 may be capable of tracking and monitoring what content or data is stored locally on any device associated with an individual's user account. For instance, backend system 100 may store indicators of the audio files that are stored locally on an individual's voice activated electronic device, such that, for a particular user account, backend system 100 is aware of which audio files are available locally. In some embodiments, backend system 100 may also monitor, track, and store location information for each electronic device associated with a user account on user accounts module 268. For example, backend system 100 may send periodic location requests to each electronic device associated with an individual's user account, and may receive location information in response to the location requests that indicates each electronic device's current location (e.g., a GPS position, an associated network address, etc.).

At step 308, text data representing the audio data may be generated. Upon receipt, backend system 100 may send the audio data representing the utterance (e.g., utterance 4) to ASR module 258. ASR module 258 may, using STT module 266, execute speech-to-text functionality on the audio data, which may generate text data representing the audio data. In some embodiments, N text strings may be generated by ASR module 258 corresponding to the N most likely text representations of the audio.

At step 310, an intent of the utterance may be determined by NLU module 260 based on the text data that was generated. In one embodiment, the intent of the utterance may be for content to be output. For example, utterance 4 may be, "Alexa—Play 'Song 1'." In this scenario, the intent may be for a song, having a title "Song 1," to be played either by the requesting device (e.g., electronic device 10), or by a separate device in communication with the requesting device (e.g., automobile 50 having speaker(s) 60).

At step 312, backend system 100 may determine whether the user account associated with the first electronic device that sent the audio data is authorized to access the content. As mentioned previously, an individual may store, or have access to, various types of content on backend system 100. For example, an individual may be able to listen to one or more songs stored on their user account. If, however, the content is not currently stored on the user account, or not accessible by the user account (e.g., through one or more additional services or applications), then that content may not be available to the individual. For example, if an individual wishes to hear a song that they do not have stored within their user account, or have access to via a music streaming application, then that song may able to be played unless an additional action occurs (e.g., the song is purchased). Thus, at step 312, backend system 100 may determine whether or not the particular content that was requested is in fact accessible for the user account.

At step 314, a determination may be made as to whether a local version of the content that was requested is available. As mentioned previously, backend system 100 may track and monitor what content is stored locally on the various electronic devices associated with a particular user account. For instance, if an individual has a voice activated electronic device and a manually activated electronic device both associated with their user account on backend system 100, the content (e.g., songs, videos, books, pictures, games, applications, etc.) that is stored locally on those devices may be stored by the user account. If a request is made for content, backend system 100 may, at step 314, first determine whether a local version is available on any of the devices associated with the user account. For example, if the requested content is a song (e.g., "Jingle Bells"), then backend system 100 may query the user account to see if one of the devices associated with the user account has an audio file of the song stored within that devices memory. If, at step 314, it is determined that no devices associated with a particular user account include the local version of the content, then process 300 may proceed to step 334, which is described in greater detail below.

If, at step 314, it is determined that one of the electronic devices associated with the user account has a local version of the requested content stored thereon, the process 300 may proceed to step 316. At step 316, another determination may be made as to whether or not the device associated with the user account that has the local version of the content is also the first electronic device (e.g., the requesting device). For example, if electronic device 10 sent the request corresponding to utterance 4 to backend system 100, backend system 100 may determine whether the local version of the song, "Song 1," is stored locally on electronic device 10. If, at step 316, it is determined that the first electronic device does have the local version stored within its memory, then process 300 may proceed to step 318. At step 318, backend system 100 may generate an instruction that causes the first electronic device to output its local version of the requested content. For example, the instruction may cause electronic device 10 to play its local version of "Song 1." In some embodiments, that instruction may further cause the first electronic device to send the local version to one or more auxiliary devices to be output. For example, the instruction may further cause electronic device 10 to send the MP3 of "Song 1" stored within memory/storage 204 to communications system 64 of automobile 50 such that the MP3 is played using speaker(s). At step 320, the instruction may be sent from backend system 100 to the first electronic device. For example, the instruction may be sent using any of the aforementioned communications protocols. In this particular instance, the instruction is of a smaller file size, and therefore takes up less bandwidth across a provider's network, than the content would take if it were to be sent to the first electronic device from backend system 100. This can aid in saving network resources available to the individual, as well as monetary costs that may be associated with sending content using the provider's network.

If, however, at step 316, it is determined that the first electronic device does not have a local version of the content, then process 300 may proceed to step 322. At step 322, a determination may be made that a second electronic device, which is also associated with the user account on backend system 100, has a local version of the content stored within its memory. For example, an individual may have a tablet that includes a version of an audiobook stored thereon. Thus, if the utterance requests that the audiobook be played, but the request originates from the individual's smartphone, backend system 100 may determine that the smartphone does not have a local version of the audiobook, however the individual's tablet does.

At step 324, backend system 100 may determine, or attempt to determine, a first location of the first electronic device. In some embodiments, backend system 100 may send a location request to the first electronic device such that the first electronic device sends its current location to backend system 100. For example, electronic device 10 may send a current GPS location to backend system 100. In some embodiments, backend system 100 may send periodic location requests to the first electronic device such that the first electronic device continually sends its location back to backend system 100. For example, backend system 100 may ping electronic device 10 every few seconds, few minutes, few hours, daily, etc., and in response, electronic device 10 may send its current GPS location to backend system 100. In some embodiments, backend system 100 may store each position of electronic device 10. In some embodiments, backend system 100, in addition to requesting a current location of electronic device 10, may also request sensor data of electronic device 10. For example, backend system 100 may request, in addition to the current location, a current measurement of one or more accelerometers of electronic device 10. This may allow backend system 100 to determine an approximate future location of electronic device 10. For example, electronic device 10 may send backend system 100 its current GPS location, as well as a current velocity and acceleration measurement from one or more resident accelerometers of electronic device 10. At step 326, backend system 100 may determine, or attempt to determine, a second location of the second electronic device. In some embodiments, step 326 may be substantially similar to step 324, with the exception that step 326 may correspond to the second electronic device.

At step 328, backend system 100 may determine whether or not the first electronic device and the second electronic device are located proximate to one another such that the second electronic device may be capable of sending its local version of the content to the first electronic device. Backend system 100 may, for example, determine a physical separation of the first electronic device and the second electronic device based on the first location and the second location. If the physical separation is less than a distance threshold, then that may indicate that the first electronic device and the second electronic device are capable of communicating with one another using a short-range communications protocol, such as Bluetooth or Wi-Fi Direct.

If, at step 328, it is determined that the first electronic device and the second electronic device are proximate to one another, then process 300 may proceed to step 330. At step 330, backend system 100 may generate an instruction for the first electronic device to request the local version of the content from the second electronic device. For example, the first electronic device (e.g., an individual's smartphone) and the second electronic device (e.g., an individual's tablet) may be located proximate enough to one another such that they are capable of communicating using a Bluetooth connection. Furthermore, the second electronic device may not be capable of receiving communications from backend system 100 (e.g., the second electronic device may not have Internet access), and so backend system 100 may send the instruction to the first electronic device. In response to receiving the instruction, the first electronic device may send a request to the second electronic device, where the request is for the second electronic device to send its stored local version of the content to the first electronic device. At step 332, backend system 100 may send the instruction to the first electronic device using any of the previously mentioned communications protocols. In some embodiments, step 332 may be substantially similar to step 320, and the previous description may apply.

If, however, at step 328, it is determined that the first electronic device and the second electronic device, which both are associated with the same user account, are not located proximate to one another (e.g., the two devices are not capable of communicating using a short-range communications protocol), then process 300 may proceed to step 334. For example, the user account may indicate that an individual's tablet has a requested audiobook stored within its memory, however the tablet may be located too far from the individual's smartphone to send the audiobook to the smartphone using a Bluetooth communications link. At step 334, backend system 100 may determine, or may attempt to determine, a first location of the first electronic device. In some embodiments, step 334 may be substantially similar to step 324, and the previous description may apply.

At step 336, backend system 100 may generate a polling instruction that requests that the first electronic device determine whether any additional devices are located proximate to the first electronic device. For example, the polling instruction may cause the first electronic device to send out requests using a Bluetooth communications protocol, to see which, if any, devices are capable of receiving the request. If there are devices that are capable of receiving the request, then that may indicate that those devices are located close enough to the first electronic device such that the two devices may communicate with one another. In some embodiments, however, backend system 100 may determine whether any additional devices associated other user accounts on backend system 100 are currently located substantially proximate to the first location of the first electronic device. At step 338, backend system 100 may send the polling instruction to the first electronic device.

In some embodiments, one or more additional devices may include a public index of content that is capable of being accessed by other devices without needing to authorize access to either device. For example, an individual may designate certain content stored on their device as "public," meaning that additional devices may be able to "see" that the device has that particular content stored. Furthermore, the additional devices may also be capable of accessing the content from the public index. As an illustrative example, an individual may designate one or more audio files as a public, such that any additional device located within a predefined distance (e.g., within a short-range communications distance) may be able to access the one or more audio files for playback.

At step 340, a determination may be made as to whether or not any additional devices were found to be located proximate to the first electronic device. If so, process 300 may proceed to step 346, where another determination is made as to whether or not the additional device(s) include a local version of the requested content. For example, although no local versions of the content may be available on the first electronic device, or a second electronic device also associated with the user account, another device located proximate to the first electronic device may include a local version of the content. As an illustrative example, an individual may request that a song play (e.g., utterance 4). Backend system 100 may determine that, although electronic device 10 does not have a local version of the song stored within its memory, and that no other electronic devices associated with the user account are accessible, another electronic device not associated with the user account is located proximate to electronic device 10 (e.g., both located within automobile 2), and has a local version of the song. If, at step 346, it is determined that an additional device proximate to the first electronic device has the local version of the content, the process 300 may proceed to step 348. At step 348, backend system 100 may generate a request for the additional device to send its local version of the content to the first electronic device. At step 350, backend system 100 may send the request to the first electronic device such that the first electronic device sends the request for the additional device's local version of the content to the additional device.

If, at step 346, backend system 100 determines that the additional device(s) do not have a local version of the content, then process 300 may proceed to step 342. At step 342, backend system 100 may generate a URL from which the first electronic device may stream the content. This may, however, be resource intensive as the content may be sent to the first electronic device across one or more networks (e.g., the Internet). At step 344, backend system 100 may send the URL to the first electronic device such that the first electronic device may start streaming the content, or sending the content to an additional device to be output (e.g., speaker(s) 60 of automobile 50).

Figure 4:
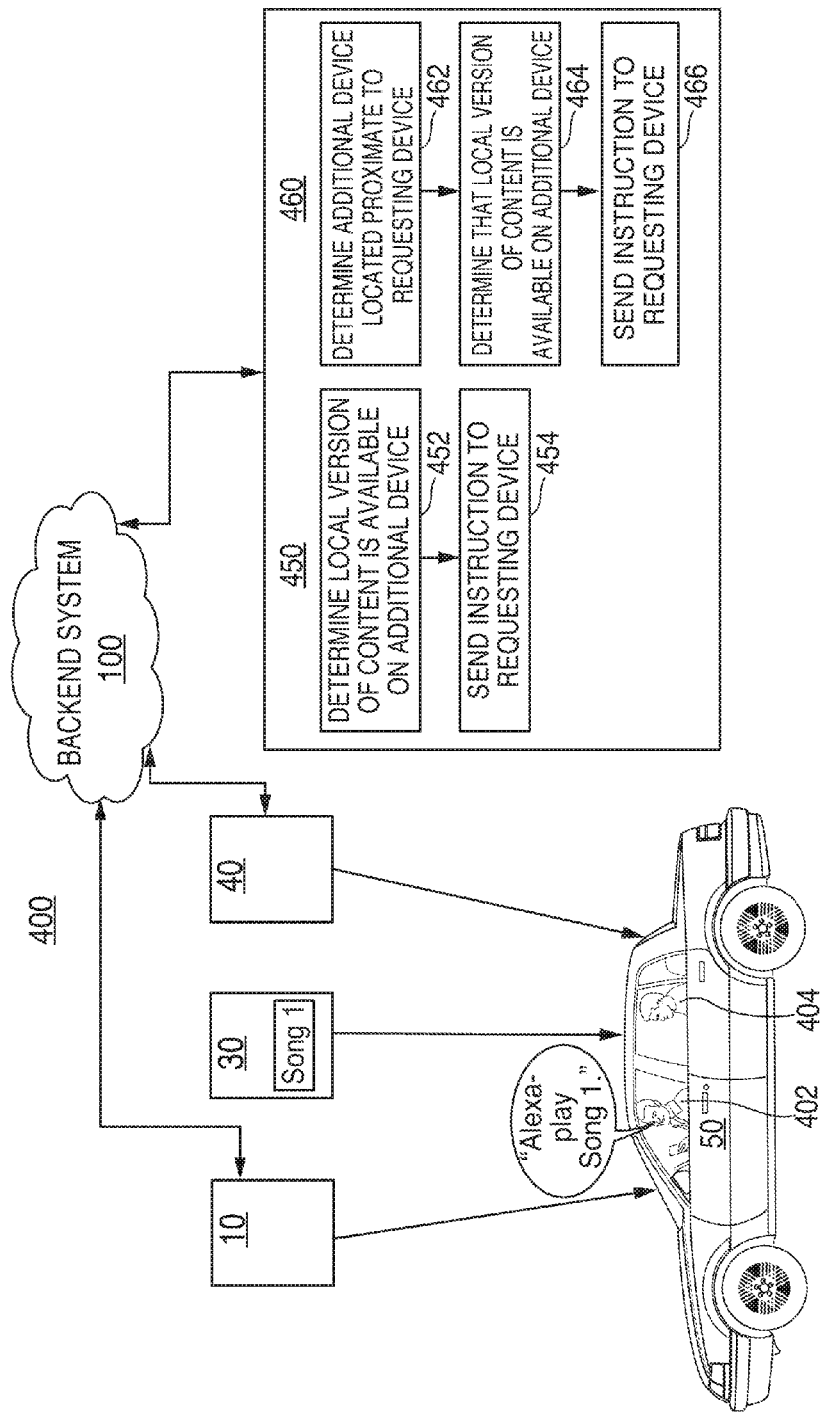
FIG. 4 is an illustrative diagram of a system for determining whether an additional device located proximate to a requesting device includes a local version of requested content, in accordance with various embodiments

FIG. 4 is an illustrative diagram of a system for determining whether an additional device located proximate to a requesting device includes a local version of requested content, in accordance with various embodiments. In the non-limiting embodiment, a system 400 may include automobile 50. Located within automobile 50 may, for instance, be a first individual 402 and a second individual 404. In one embodiment, first individual 402 may be located in a front driver's seat of automobile 50, while individual 404 may be located in a back seat of automobile 50. Persons of ordinary skill in the art will recognize, however, that the configuration of individuals 402 and 404 within automobile 50 is merely exemplary, and individuals 402 and 404 may be located at any suitable position within automobile 50, and more or fewer individuals may also be located within automobile 50.

In some embodiments, electronic device 10 may be associated with a user account on backend system 100 registered to individual 402. For instance, electronic device 10 may be a smartphone or other mobile device of individual 402, and individual 402 may have a user account on backend system 100 that stores, monitors, and/or tracks electronic device 10. For example, backend system 100 may store, within the user account of individual 402, device identification information of electronic device 10, content accessible by electronic device 10, content stored on electronic device 10, location information of electronic device 10, and/or any other additional information, or any combination thereof. In the illustrative embodiment, electronic device 10 may be capable of communicating with backend system 100 using any one of the aforementioned communications protocols. For example, electronic device 10 may subscribe to a LTE provider that enables an individual to communicate with various other devices, such as backend system 100, using one or more networks of the LTE provider.

In some embodiments, an additional electronic device 30 may also be located within automobile 50. Electronic device 30 may be substantially similar to electronic device 10, with the exception that electronic device 30 may not be capable of communicating directly with backend system 100. For example, electronic device 30 may only be configured to communicate using short-range communications protocols, such as Wi-Fi (e.g., 802.11 protocol), Bluetooth, and/or Wi-Fi Direct. Electronic device 30, in the illustrative embodiment, may also be associated with the user account on backend system 100 corresponding to individual 402. For instance, within the user account, backend system 100 may store, track, and/or monitor the various content and settings associated with electronic device 30. Backend system 100 may therefore be aware of what content (e.g., audio files, video files, image files, etc.) that are stored within memory of electronic device 30.

In one exemplary embodiment, an electronic device 40 may also be located within automobile 50. Electronic device 40 may, for instance, be associated with a different user account on backend system 100. For example, individual 404 may also have a user account on backend system 100 (e.g., within user accounts module 268), and electronic device 40 may have its device identification information, content, setting, location information, and the like, stored within the user account of individual 404. In some embodiments, electronic device 40 may also be capable of communicating with backend system 100. For example, individual 404 may also subscribe to a provider's LTE network, and therefore may be capable of accessing backend system 100 using one or more networks, such as the Internet, from the provider. In some embodiments, electronic device 40 may be substantially similar to electronic device 10, with the exception that electronic device 40 may correspond to a different user account, and a different individual (e.g., individual 404).

In some embodiments, individual 402 may speak an utterance 406, requesting content. For example, utterance 406 may be, "Alexa—Play 'Song 1'." Electronic device 10, for example, may be a voice activated electronic device, which may be triggered in response to detecting an utterance of a wakeword (e.g., "Alexa"). In response to detecting the wakeword, electronic device 10 may send audio data representing utterance 406 to backend system 100 using one or more communications protocols.

In response to receiving the audio data representing utterance 406, backend system 100 may be configured to determine whether or not the requesting device (e.g., electronic device 10) has a local version of the content available. For example, backend system 100 may access a user account associated with electronic device 10, and may determine whether or not electronic device 10 has an audio file, such as an MP3, of the requested song (e.g., "Song 1") stored within memory/storage 204. However, in some embodiment, backend system 100 may determine that the requesting device does not have a local version of the content, but that another electronic device also associated with that user account has a local version of the content stored within its memory, as seen within step 452 of process 450. For example, backend system 100 may determine that electronic device 30, which may also be associated with a user account of individual 402, may have the audio file of the requested song stored within its memory. Backend system 100 may then be configured to perform step 454, whereby an instruction may be generated for the requesting device to request the local version from the additional electronic device. For example, backend system 100 may generate an instruction for electronic device 10 to request that electronic device 30 send the local version of the audio file to electronic device 10. Backend system 100 may then send the instruction to the requesting device (e.g., electronic device 10).

If the additional electronic device is located proximate to the requesting electronic device, then the additional electronic device may be capable of sending the local version of the content to the requesting device using one or more short-range communications protocols (e.g., Bluetooth or Wi-Fi Direct). However, if the two devices are not located proximate to each other, or the additional electronic device is not powered on, or in a mode with which data may not be communicated therefrom, and then backend system 100 may instead perform process 460, which may begin at step 462.

At step 462, backend system 100 may determine that an additional device associated with a different user account may be located proximate to the requesting device. For example, backend system 100 may determine that electronic device 40, corresponding to a user account of individual 404, is located proximate to electronic device 10. In some embodiments, backend system 100 may poll a GPS location of electronic device 10, and may determine that another device, electronic device 40, may also be located substantially nearby (e.g., within communicable range). If the additional electronic device is located proximate to the requesting device, then backend system 100 may determine whether the additional device has a local version of the content stored thereon. For example, electronic device 40 may have a local version of the audio file for "Song 1" stored within its memory. Backend system 100 may, for instance, determine that the user account of individual 404 indicates that electronic device 40 has previously downloaded a local version of the content, and therefore may be capable of providing that local version to electronic device 10. If so, backend system 100 may generate and send an instruction that requests that the additional electronic device send its local version of the content to the requesting device, at step 466. For example, backend system 100 may send, to electronic device 10, an instruction that causes electronic device 10 to send a request to electronic device 40, using a short-range communications channel existing between the two devices. In this way, electronic device 40 may provide the requested content to electronic device 10 such that the content need not be sent over a provider's network to electronic device 10 from backend system 100.

Figure 5:
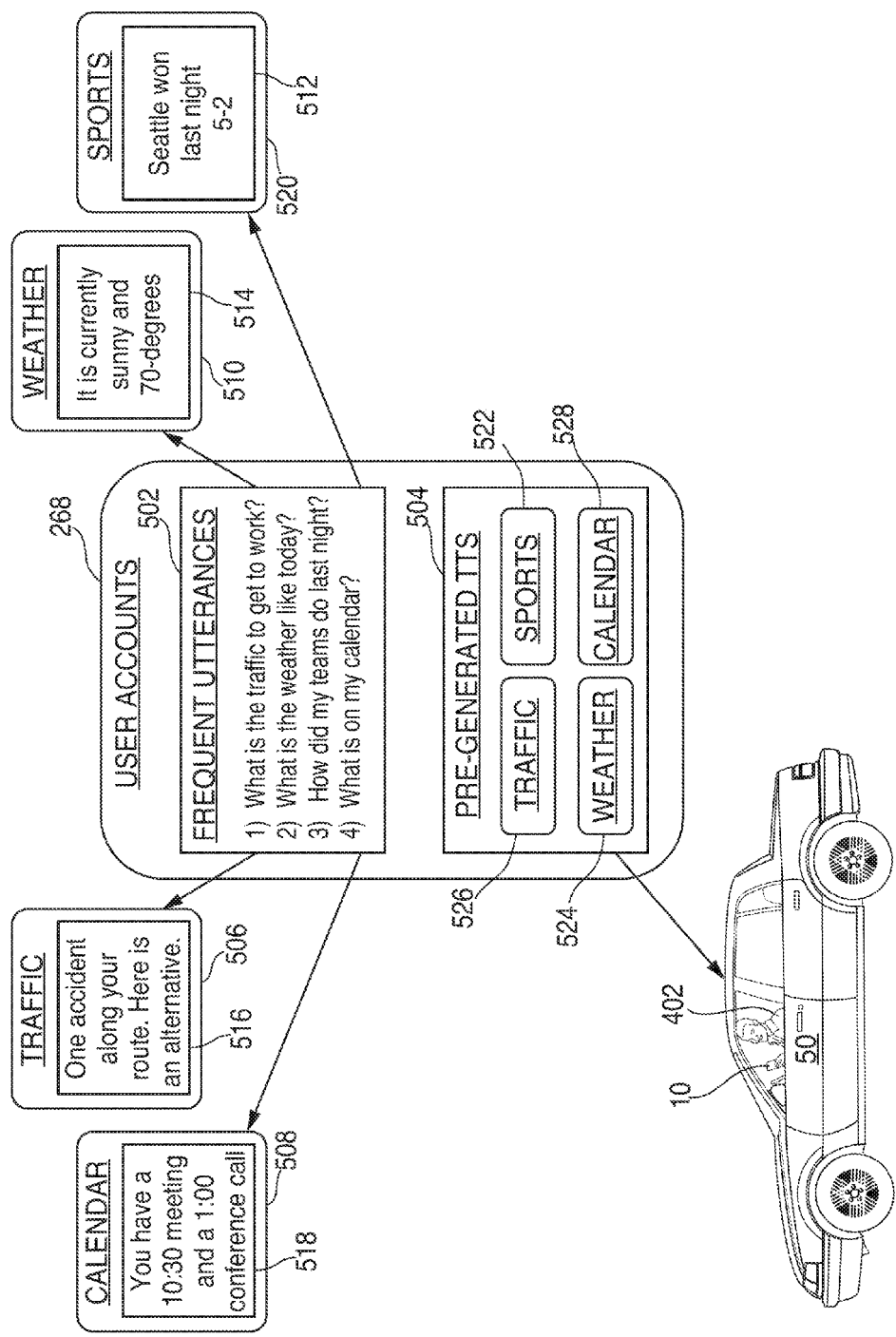
FIG. 5 is an illustrative diagram of a system for pre-caching information various requesting devices, in accordance with various embodiments.

FIG. 5 is an illustrative diagram of a system for pre-caching information various requesting devices, in accordance with various embodiments. In some embodiments, backend system 100 may monitor an individual's activities and interactions with backend system 100, and may generate response messages and send those response message to electronic device 10 prior to the individual makes a request that would have otherwise yielded the response message.

In an illustrative, non-limiting embodiment, backend system 100 may track various utterances made by an individual via their electronic device. For example, individual 404 may use electronic device 10, which may be a voice activated electronic device, to obtain certain content or information with some regularity. Within user accounts module 268, a frequent utterances module 502 may store a listing of each utterance made by individual 404. For example, individual 404 may speak an utterance, "What is the traffic to get to work," to electronic device 10. Electronic device 10 may send, to backend system 100, audio data representing the utterance, and backend system 100 may generate text data representing the audio data, determine an intent of the utterance using the text data, determine an appropriate response to the utterance, and may generate and send audio data of the response to electronic device 10.

Frequent utterances module 502 may store text data corresponding to each utterance that was made, and may also arrange the text data by which utterances were made most often. Some common utterances that may be stored within utterances module 502 may include, for example, "What is the traffic to get to work?", "What is the weather like today?", "How did my teams do last night?", and "What is on my calendar today?". Each of these utterances, when being responded to, may access one or more applications or services. For example, the utterance, "What is the traffic to get to work today?" may utilize a traffic application module 506, while the utterance, "What is the weather like today?" may utilize a weather application 510. Further still, the utterance, "How did my teams do last night?" may utilize a sports application 520, and the utterance "What is on my calendar?" may utilize a calendar application 518.

Depending on the frequency with which each utterance is made, backend system 100 may preemptively determine a response message to use for the utterance and generate audio data representing the response message. Furthermore, backend system 100 may send the audio data of these response messages to electronic device 10 prior to individual 404 speaking the corresponding utterance. In this way, if individual 404 says, "What is on my calendar?", pre-generated audio data of a response message 518, "You have a 10:30 meeting and a 1:00 conference call," may be stored on electronic device 10. This may allow backend system 100 to determine that a local version of the requested content is stored on electronic device 10, and therefore backend system 100 may not need to formulate a response to the new utterance.

In some embodiments, user accounts module 268 may include a pre-generated TTS module 504, which determines responses to frequent utterances, generates audio data of those responses, and sends the audio data to electronic device 10 to be cached. Pre-generated TTS module 504 may analyze the different utterances stored within frequent utterances module 502, as well as the various actions performed by an individual using electronic device 10, to determine behavioral information for individual 404. This may indicate the content, such as what response messages to preemptively generate, that individual 404 may be likely to request. For example, most morning at approximately 9:00, individual 404 may speak, to electronic device 10, an utterance, "What is the traffic like to get to work today?" Electronic device 10 may send audio data representing the utterance to backend system 100, which may determine an appropriate response, and may send audio data back to electronic device 10 of that response. For example, backend system 100 may send down audio data of a message 516, "One accident along your route. Here is an alternative."

However, backend system 100 may, using frequent utterances module 502, determine that because the same, or substantially the same utterance is received almost daily, then prior to receiving the request the response message may be formed and sent to electronic device 10. For example, backend system 100 may determine that the utterance, "What is the traffic to get to work?" is asked in excess of a threshold value, indicating that it is a frequently asked utterance. Therefore, backend system 100 may, prior to receiving the utterance on a particular day, determine, using traffic application 506, the current traffic conditions (e.g., response message 516), generate audio data of the response information, send the response information to pre-generated TTS module 504, which in turn may send the audio data to electronic device 10 to be stored within memory/storage 504. Thus, if individual 404 asks, "What is the traffic to get to work today?", backend system 100 may recognize that audio data of the response is already stored locally on electronic device 10, and may send an instruction down to electronic device 10 to output the local version.

In some embodiments, pre-generated TTS module 504 may store text data of the response information of the most frequently received utterances. For example, the most frequently received utterances may correspond to traffic, weather, sports, and calendar information. Thus, traffic application 506 may be used to obtain traffic information 516, weather application 510 may be used to obtain weather information 514, sports application 520 may be used to obtain sports information 512, and calendar application 518 may be used to obtain calendar information 518. Backend system 100 may then receive text data representing the various responses including appropriate response information for each frequent utterance, and may generate audio data representing each of those responses. The text data of each response, as well as the audio data representing that text data, may be stored within pre-generated TTS module 504. For example, pre-generated TTS module 504 may store traffic response 526 including text data representing traffic information 516, weather response 524 including text data representing weather information 514, sports response 522 including text data representing sports information 512, and calendar response 528 representing calendar information 518. Upon receiving the text data for each of responses 522, 524, 526, and 528, TTS module 264 may generate corresponding audio data representing the text data, and backend system 100 may send that audio data to electronic device 10.

Figure 6:
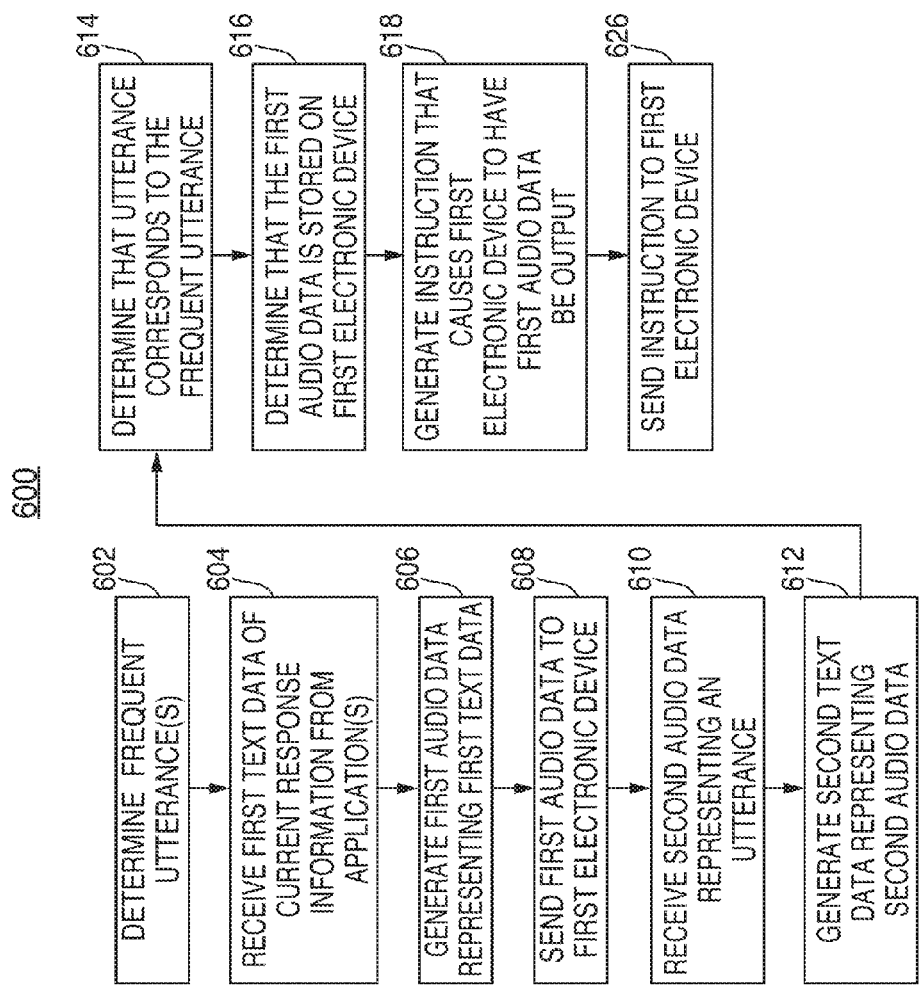
FIG. 6 is an illustrative flowchart of a process for determining that a pre-cached response to a command is stored on a local device, in accordance with various embodiments.

FIG. 6 is an illustrative flowchart of a process for determining that a pre-cached response to a command is stored on a local device, in accordance with various embodiments. Process 600, in a non-limiting embodiment, may begin at step 602. At step 602, one or more frequent utterances made by an individual having a user account on backend system 100 may be determined. In some embodiments, each time an individual speaks an utterance to their electronic device (e.g., electronic device 10), audio data representing that utterance may be sent to backend system 100, and text data representing that audio data may be generated. The text data of each utterance, as well as an intent of that utterance and an application, or applications, used for responding to the utterance, may be stored within the individual's user account on user accounts module 268. For example, frequent utterances module 502 may store text data of every utterance, as well as determine which utterances are most frequently spoken. Furthermore, user accounts module 268 may store indications of which applications (e.g., weather application 510, sports application 520, traffic application 516, calendar application 518, etc.) were used for responding to each particular utterance.

At step 604, first text data representing a current response, including current response information obtained from one or more applications capable of being used to respond to a frequent utterance, may be received. For instance, frequent utterances module 502 may include text data representations of various frequently received utterances. For example, the utterances, "What is the traffic to get to work?", "What is the weather like today?", "How did my teams do last night?", "What is on my calendar?" may be some of the utterances that are typically spoken by an individual to their electronic device, which in turn sends audio data representing those utterances to backend system 100 for obtaining responses. Each of these utterances may utilize a different application, or different applications, in order to generate responses to some of the exemplary responses. For example, traffic application 506 may be used to respond to the utterance, "What is the traffic to get to work?" In some embodiments, backend system 100 may, pre-emptily, request text data representing a response from the corresponding applications that may be used to response to the frequent utterances. For example, prior to an individual asking for the traffic, backend system 100 may request traffic information from traffic application 506, and may receive text data representing a response including traffic information 516. Similarly, prior to an individual asking for a current weather forecast, sports information pertinent to the individual, or calendar information for the individual, backend system 100 may request weather information from weather application 510, sports information from sports application 520, and calendar information from calendar application 508. Text data representing a response including weather information 514, sports information 512, and calendar information 518, may then be received from their respective applications.

At step 606, first audio data representing the first text data may be generated. In some embodiments, backend system 100 may, upon receiving the text data representing a response to a frequent utterance, send the text data to TTS module 264, which may execute text-to-speech functionality on the text data to generate audio data. For example, audio data representing the text data, "It is currently sunny and 70-degrees," may be pre-emptily generated for the frequent utterance, "What is the weather like today?" In some embodiments, each pre-generated audio data, or TTS, may be stored within pre-generated TTS module 504. For example, pre-generated traffic audio data 526, pre-generated weather audio data 524, pre-generated sports audio data 522, and pre-generated calendar audio data 528, may each be stored within pre-generated TTS module 504.

At step 608, the first audio data may be sent from backend system 100 to the first electronic device. For instance, each of the pre-generated TTS messages (e.g., pre-generated traffic audio data 526, pre-generated weather audio data 524, pre-generated sports audio data 522, and pre-generated calendar audio data 528) may be sent from backend system 100 to electronic device 10, to be stored within memory/storage 204. In some embodiments, however, backend system 100 may alternatively send the corresponding text data representing the responses to electronic device 10 as opposed to sending the audio data. In this particular scenario, electronic device 10 may be configured to perform text-to-speech functionality, and therefore generate the corresponding audio data locally. This may further reduce the overall bandwidth consumption by electronic device 10, however this may require that electronic device 10 have, or obtain, text-to-speech capabilities.

At step 610, backend system 100 may receive second audio data representing an utterance. For example, individual 404 may say, "Alexa—What is the weather like today?" In response to detecting the wakeword, "Alexa," electronic device 10, which may be a voice activated electronic device, may send audio data representing the utterance to backend system 100. At step 612, second text data representing the second audio data may be generated. For example, the second audio data may be sent to ASR module 258, which may, using STT module 266, execute speech-to-text functionality on the second audio data to generate the second text data. In some embodiments, steps 610 and 612 of process 600 may be substantially similar to steps 302 and 308 of process 300, and the previous description may apply. Furthermore, in some embodiments, device identification information and an associated user account of the device that sent the second audio data (e.g., steps 304 and 306 of process 300) may also be performed, however this is merely exemplary.

At step 614, backend system 100 may determine, using NLU module 260, that the utterances corresponds to one of the frequent utterances stored within frequent utterance module 502. For example, in response to generating the text data of the utterance, "Alexa—What is the weather like today?", NLU module 260 may determine that the text data is substantially similar to the text data of one of the frequent utterances. If so, backend system 100 may flag the second text data as corresponding to one of the frequently received utterances. At step 616, backend system 100 may further determine that the first audio data, which includes response information 514 for responding to the utterance, was already cached by the first electronic device. For example, after determining that the second text data corresponds to text data of one of the frequent utterances, backend system 100 may determine that NLU module 260 pre-generated the response for that utterance, and caused the audio data of the response to be sent to electronic device 10.

At step 618, backend system 100 may generate an instruction that causes the first electronic device to have the first audio data be output. Due to the pre-generated TTS response 524, for example, already being pre-cached to electronic device 10, backend system 100 may not need to response to the second audio data because a response is already stored locally. Therefore, backend system 100 may send, at step 620, an instruction to electronic device 10, which causes electronic device 10 to output pre-generated TTS audio data 524. In some embodiments, backend system 100 may be configured such that it only pushes the pre-generated TTS responses to electronic device 10 if electronic device 10 is not operating on a provider's network. For example, if an individual is home, and their electronic device 10 is communicating across a Wi-Fi (e.g., 802.11 protocol) of the home, then backend system 100 may be configured to push the various pre-generated TTS responses of pre-generated TTS module 504 to electronic device 10. This may allow electronic device 10 to conserve bandwidth and network resources when making requests when not on their home network so that local versions of the requested content are provided to their electronic device at an earlier time.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:
1. A method, comprising:
receiving from a first user device, at an electronic device, first audio data representing a first utterance;
determining a first customer identifier associated with the first user device;
determining, using the first customer identifier, a user account on the electronic device, wherein the user account is associated with the first user device;
generating first text data representing the first audio data by executing speech-to-text functionality on the first audio data;
determining, using the first text data, that a first intent of the first utterance is for a song to be played;
determining a download history for the user account, the download history indicating content that has been downloaded from the electronic device by one or more devices associated with the user account;
determining, based on the download history, that first song audio data representing the song was previously downloaded to the first user device from the electronic device;
determining a first user device profile associated with the user account, the first user device profile being associated with the first user device and indicating content items that are currently stored by the first user device;

determining, from the first user device profile, that the first song audio data is stored in memory by the first user device;
generating a first instruction to cause the first user device to play the first song audio data;
sending the first instruction to the first user device;
receiving, at the electronic device, second audio data representing a second utterance that requests additional music to be played, the second audio data being received from the first user device;
generating second text data representing the second audio data by executing the speech-to-text functionality on the second audio data;
determining, using the second text data, that a second intent of the second utterance is for a new song to be played;
determining, based on the download history, that second song audio data representing the new song is not stored within the memory;
determining, based on the download history, that a second user device associated with the user account had previously downloaded the second song audio data;
determining that the first user device and the second user device are capable of communicating directly with each other using a direct communications link;
generating a second instruction that causes the first user device to request that the second user device send the second song audio data to the first user device using the direct communications link; and
sending the second instruction to the first user device.

2. The method of claim 1, further comprising:
generating, in response to determining that the first song audio data is stored in the memory, third text data representing a first audio message to introduce the song to be played;
generating third audio data representing the third text data by executing text-to-speech functionality on the third text data; and
sending the third audio data to the first user device such that the first audio message is played prior to the first song audio data being played.

3. The method of claim 1, further comprising:
determining a number of instances with which a third utterance is received from the first user device;
determining that the number is greater than a frequent utterance threshold value indicating that the third utterance is a frequent utterance;
determining a response for the third utterance prior to receiving an additional instance of the third utterance from the first user device;
generating third text data representing the response;
generating third audio data representing the third text data by executing text-to-speech functionality on the third text data;
sending the third audio data to the first user device such that the third audio data is stored within the memory;
receiving, at the electronic device, fourth audio data representing a fourth utterance;
generating fourth text data representing the fourth audio data by executing the speech-to-text functionality on the fourth audio data;
determining, using fourth text data, that the fourth utterance is the frequent utterance;
determining, based on the first user device profile, that the first user device includes the third audio data stored within the memory;
generating a third instruction to cause the first user device to play the third audio data; and
sending the third instruction to the first user device.

4. A method, comprising:
receiving, from a first device, first audio data representing a first utterance;
determining a user account associated with the first device;
determining, based on first text data representing the first audio data, that a first intent of the first utterance is for first content to be output;
determining, for the user account, content information associated with at least the first device;
determining, based on the content information, that a first local version of the first content is stored on the first device;
generating a first instruction for the first local version to be output by the first device;
sending the first instruction to the first device;
receiving, from the first device, second audio data representing a second utterance;
determining, based on second text data representing the second audio data, that a second intent of the second utterance is for second content to be output;
determining that a second device is also associated with the user account;
determining, based on the content information, that a second local version of the second content is stored on the second device; and
determining that the second device and the first device are capable of communicating using at least one short-range communications protocol.

5. The method of claim 4, further comprising:
generating, prior to generating the first instruction, third text data representing a first response;
generating third audio data representing the third text data; and
sending the third audio data to the first device such that the first response outputs prior to the first local version.

6. The method of claim 4, further comprising:
generating a second instruction that causes the second device to send the second local version to the first device using the at least one short-range communications protocol; and
sending the second instruction to the first device.

7. The method of claim 4, further comprising:
determining, prior to generating the first instruction, a first file size of the first content;
determining that the first file size is greater than a predefined file size threshold; and
determining that, for the user account, the first local version is to be output prior to sending a link to the first content to the first device based on the first file size being greater than the predefined file size threshold.

8. The method of claim 4, further comprising:
determining frequent utterances associated with the user account;
generating, prior to receiving third audio data representing one of the frequent utterances, third text data representing at least one response to the frequent utterances;
generating third audio data representing the third text data; and
sending the third audio data to the first device such that the at least one response is available to be output by the first device.

43

9. The method of claim 4, further comprising:
receiving, from the first device, third audio data representing a third utterance;
determining, based on third text data representing the third audio data, that a third intent of the third utterance is for third content to be output by the first device;
determining, from the content information, that the first device does not include a third local version of the third content;
determining that the second device is incapable of communicating with the first device using the at least one short range communications protocol;
generating a link for the third content stored with a remote device; and
sending the link to the first device such that the third content is output.

10. The method of claim 4, further comprising:
receiving, from the first device, third audio data representing a third utterance;
determining that a response is to be output, the response having a first temporal duration;
determining, from the content information, that fourth audio data of the response is stored on the first device;
generating a second instruction that causes the fourth audio data to be output by the first device; and
sending the second instruction to the first device such that the response is output while a third intent of the third utterance is being determined.

11. An electronic device, comprising:
communications circuitry operable to communicate with at least a first device;
memory; and
at least one processor operable to:
receive, from a first device, first audio data representing a first utterance;
determine a user account associated with the first device;
determine, based on first text data representing the first audio data, that a first intent of the first utterance is for first content to be output;
determine that a first local version of the first content is stored on the first device;
generate second text data representing a first response;
generate second audio data representing the second text data;
generate a first instruction for the first local version to be output by the first device;
send, using the communications circuitry, the first instruction and the second audio data to the first device such that the first local version is output after the second audio data;
receive, from the first device, second audio data representing a second utterance;
generate second text data from the second audio data by applying speech-to-text processing to the second audio data;
determine, based on the second text data, that a second intent of the second utterance is for second content to be output by the first device;
determine, from content information associated with at least the first device, that the first device does not include a second local version of the second content;
determine that there are no additional devices associated with the user account that are capable to send content to the first device using a short-range communications protocol;

44 generate a link between the first device and a remote device storing a third local version of the second content; and
send, using the communications circuitry, the link to the remote device such that the second content is output to the first device.

12. The electronic device of claim 11, wherein the at least one processor is further operable to:
determine, using the content information, that the first local version is stored on the first device.

13. The electronic device of claim 11, wherein the at least one processor is further operable to:
receive, from the first device, third audio data representing a third utterance;
determine, based on third text data representing the third audio data, that a third intent of the third utterance is for third content to be output;
determine that a second device is also associated with the user account;
determine, based on the content information, that a third local version of the third content is stored on the second device; and
determine, based on a first separation distance between the first device and the second device being less than a separation distance threshold, that the second device and the first device are capable of communicating using at least one short-range communications protocol.

14. The electronic device of claim 13, wherein the at least one processor is further operable to:
generate a second instruction that causes the second device to send the third local version to the first device using the at least one short-range communications protocol; and
send, using the communications circuitry, the second instruction to the first device.

15. The electronic device of claim 11, wherein the at least one processor is further operable to:
determine, prior to generating the first instruction, a first file size of the first content;
determine that the first file size is greater than a predefined file size threshold; and
determine that, for the user account, the first local version is to be output prior to sending a link to the first content to the first device based on the first file size being greater than the predefined file size threshold.

16. The electronic device of claim 11, wherein the at least one processor is further operable to:
determine frequent utterances associated with the user account;
generate, prior to receiving further audio data representing one of the frequent utterances, third text data representing at least one second response to the frequent utterances;
generate third audio data representing the third text data; and
send, using the communications circuitry, the third audio data to the first device such that the at least one second response is available to be output by the first device.

17. The electronic device of claim 11, wherein the at least one processor is further operable to:
receive third audio data representing a third utterance from the first device;
determine that a second response is to be output, the second response having a first temporal duration;
determine, from the content information, that fourth audio data of the second response is stored on the first device;

generate a second instruction that causes the fourth audio data to be output by the first device; and send, using the communications circuitry, the second instruction to the first device such that the second response is output while a third intent of the third utterance is being determined.

\* \* \* \* \*